(12) United States Patent
Nomura et al.

(10) Patent No.: US 8,665,914 B2
(45) Date of Patent: Mar. 4, 2014

(54) SIGNAL ANALYSIS/CONTROL SYSTEM AND METHOD, SIGNAL CONTROL APPARATUS AND METHOD, AND PROGRAM

(75) Inventors: Toshiyuki Nomura, Tokyo (JP); Osamu Shimada, Tokyo (JP); Akihiko Sugiyama, Tokyo (JP); Osamu Hoshuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 300 days.

(21) Appl. No.: 12/920,430

(22) PCT Filed: Mar. 10, 2009

(86) PCT No.: PCT/JP2009/054500
§ 371 (c)(1),
(2), (4) Date: Aug. 31, 2010

(87) PCT Pub. No.: WO2009/113516
PCT Pub. Date: Sep. 17, 2009

(65) Prior Publication Data
US 2011/0002225 A1    Jan. 6, 2011

(30) Foreign Application Priority Data

Mar. 14, 2008  (JP) .................. 2008-065086

(51) Int. Cl.
*H04J 3/12* (2006.01)
*G10L 19/00* (2013.01)
*G06F 17/00* (2006.01)
*G10L 21/0208* (2013.01)

(52) U.S. Cl.
CPC ............. *H04J 3/12* (2013.01); *G10L 21/0208* (2013.01)
USPC ........... 370/527; 370/522; 370/464; 704/501; 700/94

(58) Field of Classification Search
USPC ......... 370/241, 464, 522, 527, 528, 529, 535; 704/500, 501; 700/94
See application file for complete search history.

(56) References Cited

U.S. PATENT DOCUMENTS

| 5,717,724 A | 2/1998 | Yamazaki et al. |
| 6,233,554 B1 | 5/2001 | Heimbigner et al. |
| 2002/0087304 A1 | 7/2002 | Kjorling et al. |

(Continued)

FOREIGN PATENT DOCUMENTS

| JP | 06-222789 A | 8/1994 |
| JP | 08-130513 A | 5/1996 |

(Continued)

OTHER PUBLICATIONS

Machine Translation of JP2006-211255.*

(Continued)

*Primary Examiner* — Paul H Masur
(74) *Attorney, Agent, or Firm* — Sughrue Mion, PLLC

(57) ABSTRACT

A signal analysis/control system includes: a signal analysis unit which analyzes an input signal of a transmission unit and generates analysis information; and a signal control unit which controls the input signal of a reception unit by using the analysis information. Thus, the signal analysis is performed in the transmission unit. This reduces the calculation amount concerning the signal analysis in the reception unit. Furthermore, the reception unit can control each of the constituent elements of the input signal according to the signal analysis information obtained in the transmission unit.

17 Claims, 15 Drawing Sheets

(56) References Cited

U.S. PATENT DOCUMENTS

| | | | |
|---|---|---|---|
| 2004/0049383 A1* | 3/2004 | Kato et al. | 704/226 |
| 2005/0195981 A1* | 9/2005 | Faller et al. | 381/23 |
| 2005/0226426 A1* | 10/2005 | Oomen et al. | 381/23 |
| 2007/0233470 A1* | 10/2007 | Goto et al. | 704/208 |
| 2008/0097750 A1* | 4/2008 | Seefeldt et al. | 704/201 |
| 2008/0221907 A1* | 9/2008 | Pang et al. | 704/500 |
| 2009/0172060 A1* | 7/2009 | Taleb et al. | 708/322 |

FOREIGN PATENT DOCUMENTS

| | | |
|---|---|---|
| JP | 08-336137 A | 12/1996 |
| JP | 2001-526414 A | 12/2001 |
| JP | 2002-204175 A | 7/2002 |
| JP | 2004-514179 A | 5/2004 |
| JP | 2004-163696 A | 6/2004 |
| JP | 2006-211255 A | 8/2006 |
| JP | 2006-270474 A | 10/2006 |
| JP | 2006-337415 A | 12/2006 |
| JP | 2007-094388 A | 4/2007 |
| WO | 02/080148 A1 | 10/2002 |
| WO | 2006108573 A1 | 10/2006 |
| WO | 2007/029536 A1 | 3/2007 |
| WO | WO 2007/032647 A1 | 3/2007 |
| WO | 2007091842 A1 | 8/2007 |
| WO | 2008/004499 A1 | 1/2008 |

OTHER PUBLICATIONS

Kazuhiro Yamato et al, "Post Processing Noise Suppressor with Adaptive Gain-Flooring for Cell Phone Handsets and IC Recorders", IEEE International Conference on Consumer Electronics, 6.1-4, Jan. 2007, pp. 1-2.

N. S. Jayant et al., "Digital Coding of Waveforms, Principles and Applications to Speech and Video", Prentice Hall, 1990, pp. 510-563.

Alan V. Oppenheim et al., "Digital Signal Processing", Prentice Hall, 1975, pp. 238-251.

P.P. Vaidyanathan, "Multirate Systems and Filter Banks", Prentice Hall, 1993, pp. 188-271.

Manfred R. Schroeder et al., "Code-Excited Linear Prediction (CELP): High Quality Speech at Very Low Bit Rates", IEEE International Conference on Acoustics, Speech, and Signal Processing, 25.1.1., Mar. 1985, pp. 937-940.

Yariv Ephraim et al., "Speech Enhancement Using a Minimum Mean-Square Error Short-Time Spectral Amplitude Estimator", IEEE Transactions on Acoustics, Speech, and Signal Processing, Dec. 1984, pp. 1109-1121, vol. ASSP-32, No. 6.

Y. Ephraim et al., "Speech Enhancement Using a Minimum Mean-Square Error Log-Spectral Amplitude Estimator", IEEE Transactions on Acoustics, Speech, and Signal Processing, Apr. 1985, pp. 443-445, vol. ASSP-33, No. 2.

Thomas Lotter et al., "Speech Enhancement by MAP Spectral Amplitude Estimation Using a Super-Gaussian Speech Model", EURASIP Journal on Applied Signal Processing, Jul. 2005, pp. 1110-11126, vol. 2005, Issue 7.

"Information technology-MPEG audio technologies", ISO/IEC 23003-1, Feb. 15, 2007, Part 1: MPEG Surround.

Communication, dated Nov. 9, 2011, issued by the Intellectual Property Office of P.R. China in corresponding Chinese Application No. 200980107232.4.

Herre, J. et al. "The Reference Model Architecture for MPEG Spatial Audio Coding," Audio Engineering Society Convention Paper, New York, NY, US, May 28, 2005, pp. 1-13, XP009059973; sections 2,4.5.1,4.5.3; figures 1,8.

Extended European Search Report dated Dec. 14, 2012, issued by the European Patent Office in counterpart European Application No. 09719066.4.

Japanese Office Action issued Sep. 18, 2013 in corresponding Japanese Patent Application No. 2010-502815.

* cited by examiner

FIG. 35            PRIOR ART

SIGNAL ANALYSIS/CONTROL SYSTEM AND METHOD, SIGNAL CONTROL APPARATUS AND METHOD, AND PROGRAM

This application is based upon and claims the benefit of priority from Japanese patent application No. 2008-65086, filed on Mar. 14, 2008, the disclosure of which is incorporated herein in its entirety by reference.

APPLICABLE FIELD IN THE INDUSTRY

The present invention relates to a method of a signal analysis and a signal control for controlling an input signal, which is configured of a plurality of sound sources, for each component element being included in the signal, its apparatus, and its computer program.

BACKGROUND ART

As a system for suppressing background noise of an input signal having a plurality of sound sources each of which is configured of desired sound and background noise, a noise suppression system (hereinafter, referred to as a noise suppressor) is known. The noise suppressor is a system for suppressing noise superposed upon a desired sound signal. The noise suppressor, as a rule, estimates a power spectrum of a noise component by employing an input signal converted in a frequency region, and subtracts the estimated power spectrum of the noise component from the input signal. With this, the noise coexisting in the desired sound signal is suppressed. In addition, these noise suppressors are applied also for the suppression of non-constant noise by successively estimating the power spectrum of the noise component. There exists, for example, the technique described in Patent document 1 as a prior art related to these noise suppressors (hereinafter, referred to as a first related prior art).

Normally, the noise suppressor of the first related prior art, which is utilized for communication, fulfils a function as a pretreatment of an encoder. An output of the noise suppressor is encoded, and is transmitted to a communication path. In a receiving unit, the signal is decoded, and an audible signal is generated. In a one-input noise suppression system of the first related prior art, as a rule, residual noise that stays as a result of being not suppressed, and distortion of emphasized sound that is outputted are in a relation of trade-off. Reducing the residual noise leads to an increase in the distortion, and reducing the distortion leads to an increase in the residual noise. The best status of a balance between the residual noise and the distortion differs dependent upon individual users. However, with a configuration in which the noise suppressor exists in the upstream side of the encoder, namely, exists in a transmission unit, the user cannot adjust a balance between the residual noise and the distortion to its own taste.

As a noise suppressor assuming a configuration capable of solving this problem, a receiving side noise suppressor shown in FIG. 35 disclosed in Non-patent document 1 is known (hereinafter, referred to as a second related prior art). In the configuration of the second related prior art, a noise suppression unit 9501 is included not in the transmission unit, but in the receiving unit. The noise suppression unit 9501 performs a process of suppressing the noise of the signal inputted from a decoder. This enables the user to adjust a balance between the residual noise and the distortion to its own taste.

Patent document 1: JP-P2002-204175A
Non-patent document 1: IEEE INTERNATIONAL CONFERENCE ON CONSUMER ELECTRONICS, 6.1-4, January 2007

DISCLOSURE OF THE INVENTION

Problems to be Solved by the Invention

The foregoing first related prior art causes a problem that the user cannot adjust a balance between the residual noise and the distortion to its own taste. The foregoing second related prior art exists as a means for solving this problem.

However, the second related prior art causes a problem that an arithmetic quantity of the receiving unit is augmented because the receiving unit performs a process of suppressing the noise, which the transmission unit performs in the first related prior art. In addition, the second related prior art causes a problem that a noise suppression function cannot be incorporated when an important function other than the function of the noise suppressor exists in the receiving unit, or a problem that the other functions cannot be incorporated due to the incorporation of the noise suppression function. The reason is that a limit is put to a total of the arithmetic quantity of the receiving unit. Further, the arithmetic quantity of the receiving unit (or a reproduction unit) is much, which incurs a decline in a sound quality and in convenience due to a limit put to a receiver function. In addition, there is a problem that the configurations as well of the first related prior art and the second related prior art cannot be applied for general separation of the signal because they aim for separating the sound from the background noise.

Thereupon, the present invention has been accomplished in consideration of the above-mentioned problems, and an object thereof is to provide a technology capable of configuring the receiving unit with a small arithmetic quantity, and of independently controlling all sorts of the input signals for each of elements constituting the input signal.

Means to Solve the Problem

The present invention for solving the above-mentioned problems is a signal control method that is characterized in receiving a multiplexed signal including a signal including a plurality of component elements and analysis information being calculated based upon the foregoing component element, generating the foregoing signal and the foregoing analysis information from the foregoing multiplexed signal, generating a correction value for correcting the foregoing analysis information based upon the foregoing analysis information, correcting the foregoing analysis information based upon the foregoing correction value, and controlling the component elements of the foregoing signal based upon the foregoing corrected analysis information.

Further, the present invention for solving the above-mentioned problems is a signal control method that is characterized in receiving a multiplexed signal including a signal including a plurality of component elements and analysis information being calculated based upon the foregoing component element, and signal control information, generating the foregoing signal and the foregoing analysis information from the foregoing multiplexed signal, generating a correction value for correcting the foregoing analysis information based upon the foregoing analysis information, correcting the foregoing analysis information based upon the foregoing correction value, and controlling the component elements of the foregoing signal based upon the foregoing corrected analysis information and the foregoing signal control information.

Further, the present invention for solving the above-mentioned problems is a signal control method that is characterized in receiving a multiplexed signal including a signal including a plurality of component elements and analysis information being calculated based upon the foregoing component element, and component element rendering information for outputting the foregoing component elements to a plurality of output channels, generating the foregoing signal and the foregoing analysis information from the foregoing multiplexed signal, generating a correction value for correcting the foregoing analysis information based upon the foregoing analysis information, correcting the foregoing analysis information based upon the foregoing correction value, and controlling the component elements of the foregoing signal based upon the foregoing corrected analysis information and the foregoing component element rendering information.

Further, the present invention for solving the above-mentioned problems is a signal control method that is characterized in receiving a multiplexed signal including a signal including a plurality of component elements and analysis information being calculated based upon the foregoing component element, signal control information, and component element rendering information for outputting the foregoing component elements to a plurality of output channels, generating the foregoing signal and the foregoing analysis information from the foregoing multiplexed signal, generating a correction value for correcting the foregoing analysis information based upon the foregoing analysis information, correcting the foregoing analysis information based upon the foregoing correction value, and controlling the component elements of the foregoing signal based upon the foregoing corrected analysis information, the foregoing signal control information, and the foregoing component element rendering information.

Further, the present invention for solving the above-mentioned problems is a signal analysis control method that is characterized in generating analysis information being calculated based upon a plurality of component elements that are included in a signal, multiplexing the foregoing signal and the foregoing analysis information and generating a multiplexed signal, receiving the foregoing multiplexed signal, generating the foregoing signal and the foregoing analysis information from the foregoing multiplexed signal, generating a correction value for correcting the foregoing analysis information based upon the foregoing analysis information, correcting the foregoing analysis information based upon the foregoing correction value, and controlling the component elements of the foregoing signal based upon the foregoing corrected analysis information.

Further, the present invention for solving the above-mentioned problems is a signal control apparatus that is characterized in including a multiplexed signal separation unit for, from a multiplexed signal including a signal including a plurality of component elements and analysis information being calculated based upon the foregoing component element, generating the foregoing signal and the foregoing analysis information, an analysis information correction value generation unit for generating a correction value for correcting the foregoing analysis information based upon the foregoing analysis information, an analysis information correction unit for correcting the foregoing analysis information based upon the foregoing correction value, and a signal processing unit for controlling the component elements of the foregoing signal based upon the foregoing corrected analysis information.

Further, the present invention for solving the above-mentioned problems is a signal control apparatus that is characterized in including a multiplexed signal separation unit for, from a multiplexed signal including a signal including a plurality of component elements and analysis information being calculated based upon the foregoing component element, generating the foregoing signal and the foregoing analysis information, an analysis information correction value generation unit for generating a correction value for correcting the foregoing analysis information based upon the foregoing analysis information, an analysis information correction unit for correcting the foregoing analysis information based upon the foregoing correction value, and a signal processing unit for receiving signal control information and controlling the component elements of the foregoing signal based upon the foregoing corrected analysis information and the foregoing signal control information.

Further, the present invention for solving the above-mentioned problems is a signal control apparatus that is characterized in including a multiplexed signal separation unit for, from a multiplexed signal including a signal including a plurality of component elements and analysis information for controlling the foregoing component element, generating the foregoing signal and the foregoing analysis information, an analysis information correction value generation unit for generating a correction value for correcting the foregoing analysis information based upon the foregoing analysis information, an analysis information correction unit for correcting the foregoing analysis information based upon the foregoing correction value, and a signal processing unit for receiving component element rendering information for outputting the foregoing component elements to a plurality of output channels, and controlling the component elements of the foregoing signal based upon the foregoing corrected analysis information, and the foregoing component element rendering information.

Further, the present invention for solving the above-mentioned problems is a signal control apparatus that is characterized in including a multiplexed signal separation unit for, from a multiplexed signal including a signal including a plurality of component elements and analysis information for controlling the foregoing component element, generating the foregoing signal and the foregoing analysis information, an analysis information correction value generation unit for generating a correction value for correcting the foregoing analysis information based upon the foregoing analysis information, an analysis information correction unit for correcting the foregoing analysis information based upon the foregoing correction value, and a signal processing unit for receiving signal control information and component element rendering information for outputting the foregoing component elements to a plurality of output channels, and controlling the component elements of the foregoing signal based upon the foregoing corrected analysis information, the foregoing signal control information, and the foregoing component element rendering information.

Further, the present invention for solving the above-mentioned problems is a signal analysis control system including a signal analysis apparatus and a signal control apparatus that is characterized in that the foregoing signal analysis apparatus includes a signal analysis unit for generating analysis information being calculated based upon a plurality of component elements that are included in a signal, and a multiplexing unit for multiplexing the foregoing signal and the foregoing analysis information and generating a multiplexed signal, and that the foregoing signal control apparatus includes a multiplexed signal separation unit for generating the foregoing signal and the foregoing analysis information from the foregoing multiplexed signal, an analysis information correction value generation unit for generating a correction value for correcting the foregoing analysis information based upon the foregoing analysis information, an analysis information correction unit for correcting the foregoing analysis information based upon the foregoing correction value, and a signal processing unit for controlling the component elements of the foregoing signal based upon the foregoing corrected analysis information.

Further, the present invention for solving the above-mentioned problems is a signal control program that is characterized in causing a computer to execute a multiplexed signal separation process of, from a multiplexed signal including a signal including a plurality of component elements and analysis information being calculated based upon the foregoing component element, generating the foregoing signal and the foregoing analysis information, an analysis information correction value generation process of generating a correction value for correcting the foregoing analysis information based upon the foregoing analysis information, an analysis information correction process of correcting the foregoing analysis information based upon the foregoing correction value, and a signal control process of controlling the component elements of the foregoing signal based upon the foregoing corrected analysis information.

Further, the present invention for solving the above-mentioned problems is a signal control program that is characterized in causing a computer to execute a multiplexed signal separation process of, from a multiplexed signal including a signal including a plurality of component elements and analysis information being calculated based upon the foregoing component element, generating the foregoing signal and the foregoing analysis information, an analysis information correction value generation process of generating a correction value for correcting the foregoing analysis information based upon the foregoing analysis information, an analysis information correction process of correcting the foregoing analysis information based upon the foregoing correction value, and a signal control process of receiving signal control information and controlling the component elements of the foregoing signal based upon the foregoing corrected analysis information and the foregoing signal control information.

Further, the present invention for solving the above-mentioned problems is a signal control program that is characterized in causing a computer to execute a multiplexed signal separation process of, from a multiplexed signal including a signal including a plurality of component elements and analysis information being calculated based upon the foregoing component element, generating the foregoing signal and the foregoing analysis information, an analysis information correction value generation process of generating a correction value for correcting the foregoing analysis information based upon the foregoing analysis information, an analysis information correction process of correcting the foregoing analysis information based upon the foregoing correction value, and a signal control process of receiving component element rendering information for outputting the foregoing component elements to a plurality of output channels, and controlling the component elements of the foregoing signal based upon the foregoing corrected analysis information and the foregoing component element rendering information.

Further, the present invention for solving the above-mentioned problems is a signal control program that is characterized in causing a computer to execute a multiplexed signal separation process of, from a multiplexed signal including a signal including a plurality of component elements and analysis information being calculated based upon the foregoing component element, generating the foregoing signal and the foregoing analysis information, an analysis information correction value generation process of generating a correction value for correcting the foregoing analysis information based upon the foregoing analysis information, an analysis information correction process of correcting the foregoing analysis information based upon the foregoing correction value, and a signal control process of receiving signal control information and component element rendering information for outputting the foregoing component elements to a plurality of output channels, and controlling the component elements of the foregoing signal based upon the foregoing corrected analysis information, the foregoing signal control information, and the foregoing component element rendering information.

Further, the present invention for solving the above-mentioned problems is a signal analysis control program that is characterized in causing a computer to execute a signal analysis process of generating analysis information being calculated based upon a plurality of component elements that are included in a signal, and the foregoing component element, a multiplexing process of multiplexing the foregoing signal and the foregoing analysis information and generating a multiplexed signal, a multiplexed signal separation process of generating the foregoing signal and the foregoing analysis information from the foregoing multiplexed signal, an analysis information correction value generation process of generating a correction value for correcting the foregoing analysis information based upon the foregoing analysis information, an analysis information correction process of correcting the foregoing analysis information based upon the foregoing correction value, and a signal control process of controlling the component elements of the foregoing signal based upon the foregoing corrected analysis information.

AN ADVANTAGEOUS EFFECT OF THE INVENTION

With the foregoing means, the present invention enables the receiving unit to reduce the arithmetic quantity relating to the signal analysis because the transmission unit analyzes the signal. In addition, the present invention enables the receiving unit to control the input signal, which is configured of a plurality of the component elements, for each component element based upon signal analysis information obtained by the transmission unit.

BRIEF DESCRIPTION OF THE DRAWINGS

FIG. 35 is a block diagram illustrating the related example.

DESCRIPTION OF NUMERALS

Figure 1:
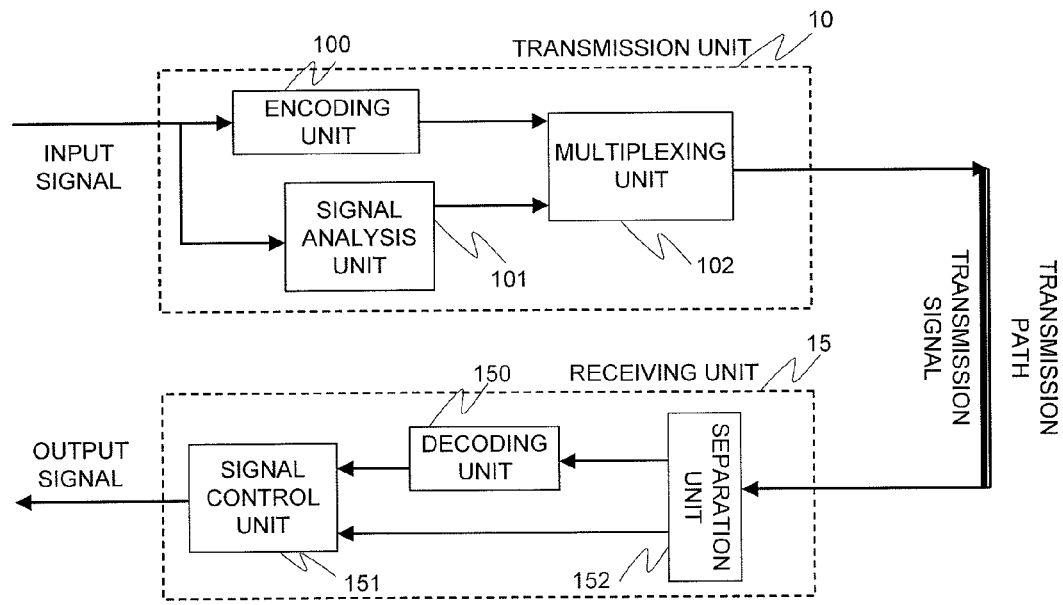
FIG. 1 is a block diagram illustrating a first embodiment of the present invention.

| | |
|---|---|
| 1 | transmission/receiving unit |
| 10, 13 and 90 | transmission units |
| 15, 18, 35, 55, and 75 | receiving units |
| 100 and 1100 | encoding units |
| 101, 900, and 1101 | signal analysis units |
| 102 | multiplexing unit |
| 110, 120, 171, and 920 | conversion units |
| 111 | quantization unit |
| 121 and 911 | analysis information calculation units |
| 150 and 1150 | decoding units |
| 151, 350, and 1151 | signal control units |
| 152 | separation unit |
| 160 | inverse quantization unit |
| 161 and 173 | inverse conversion units |
| 172 and 360 | signal processing units |
| 200 and 1020 | background sound estimation units |
| 2011 | suppression coefficient calculation unit |
| 251 and 470 | multipliers |
| 460 | suppression coefficient modification unit |
| 2610 and 2611 | coefficient correction lower-limit value estimation units |
| 2620 | suppression coefficient correction unit |
| 4630 | coefficient correction lower-limit value modification unit |
| 471 | comparison unit |
| 472 | designated suppression coefficient control unit |
| 473 | switch |
| 550 and 750 | output signal generation units |
| 563 and 760 | component element information conversion units |
| 562 | rendering unit |
| 651 and 851 | component element parameter generation units |
| 652 | rendering information generation unit |
| 910 | quantizing noise calculation unit |
| 1300 and 1301 | computers |
| 2021 | suppression coefficient encoding unit |

BEST MODE FOR CARRYING OUT THE INVENTION

Embodiments of the signal analysis control system of the present invention will be explained in details by making a reference to the accompanied drawings.

A first embodiment of the signal analysis control system of the present invention will be explained by making a reference to FIG. 1. The signal analysis control system of the present invention assumes a configuration in which a transmission unit 10 and a receiving unit 15 are connected via a transmission path. The transmission unit 10 receives an input signal that is configured of a plurality of the sound sources, and outputs a transmission signal. The transmission signal is inputted into the receiving unit 15 via the transmission path. The receiving unit 15 receives the transmission signal, and outputs an output signal. Further, the transmission unit, the transmission path, and the receiving unit could be a recording unit, a storage medium, and a reproduction unit, respectively.

The transmission unit 10 is configured of an encoding unit 100, a signal analysis unit 101, and a multiplexing unit 102. The input signal is inputted into the encoding unit 100 and the signal analysis unit 101. The input signal may include a plurality of the component elements. The signal analysis unit 101 calculates analysis information based upon the foregoing component element. The analysis information may include component element information indicative of a relation between respective component elements being included in the input signal. The signal analysis unit 101 outputs the analysis information to the multiplexing unit 102. The encoding unit 100 encodes the input signal. The encoding unit 100 outputs the encoded signal to the multiplexing unit 102. The multiplexing unit 102 multiplexes the encoded signal being inputted from the encoding unit 100, and the analysis information being inputted from the signal analysis unit 101. The multiplexing unit 102 outputs the multiplexed signal to the transmission path as a transmission signal.

The receiving unit 15 is configured of a decoding unit 150, a signal control unit 151, and a separation unit 152. At first, the transmission signal is inputted into the separation unit 152. The separation unit 152 separates the transmission signal into a main signal and the analysis information. Continuously, the separation unit 152 outputs the main signal to the decoding unit 150, and outputs the analysis information to the signal control unit 151, respectively. The decoding unit 150 decodes the main signal, and generates the decoded signal. And, the decoding unit 150 outputs the decoded signal to the signal control unit 151. The signal control unit 151 manipulates the decoded signal received from the decoding unit 150 for each component element based upon the analysis information received from the separation unit 152. The signal control unit 151 outputs the manipulated signal as an output signal. The signal control unit 151 may manipulate the decoded signal with the component element group, which is configured of a plurality of the component elements, defined as a unit instead of the component element. Further, the component element being included in the input signal could be a sound source. At this time, the signal control unit 151 manipulates the decoded signal for each sound source that corresponds to the component element.

Continuously, a configuration example of the encoding unit 100 will be explained in details by making a reference to FIG. 2. The encoding unit 100 receives the input signal, and outputs the encoded signal. The encoding unit 100 is configured of a conversion unit 110 and a quantization unit 111. At first, the input signal is inputted into the conversion unit 110. Next, the conversion unit 110 decomposes the input signal into frequency components, and generates a first converted signal. The conversion unit 110 outputs the first converted signal to the quantization unit 111. And, the quantization unit 111 quantizes the first converted signal, and outputs it as an encoded signal.

The conversion unit 110 configures one block by collecting a plurality of input signal samples, and applies a frequency conversion for this block. As an example of the frequency conversion, a Fourier transform, a cosine transform, a KL (Karhunen Loeve) transform, etc. are known. The technology related to a specific arithmetic operation of these transforms, and its properties are disclosed in Non-patent document 2 (DIGITAL CODING OF WAVEFORMS, PRINCIPLES AND APPLICATIONS TO SPEECH AND VIDEO, PRENTICE-HALL, 1990).

The conversion unit 110 also can apply the foregoing transforms for a result obtained by weighting one block of the input signal samples with a window function. As such a window function, the window functions such as a Hamming window, a Harming (Hann) window, a Kaiser window, and a Blackman window are known. Further, more complicated window functions can be employed. The technology related to these window functions is disclosed in Non-patent document 3 (DIGITAL SIGNAL PROCESSING, PRENTICE-HALL, 1975) and Non-patent document 4 (MULTIRATE SYSTEMS AND FILTER BANKS, PRENTICE-HALL, 1993).

An overlap of each block may be permitted at the moment that the conversion unit 110 configures one block from a plurality of the input signal samples. For example, with the case of applying an overlap of 30% of a block length, the last 30% of the signal sample belonging to a certain block is repeatedly employed in a plurality of the blocks as the first 30% of the signal sample belonging to the next block. The technology relating to the blocking involving the overlap and the conversion is disclosed in the Non-patent document 2.

In addition, the conversion unit 110 may be configured of a band-division filter bank. The band-division filter bank is configured of a plurality of band-pass filters. The band-division filter bank divides the received input signal into a plurality of frequency bands, and outputs them to the quantization unit 111. An interval of each frequency band of the band-division filter bank could be equal in some cases, and unequal in some cases. Band-dividing the input signal at an unequal interval makes it possible to lower/raise a time resolution, that is, the time resolution can be lowered by dividing the input signal into narrows bands with regard to a low-frequency area, and the time resolution can be raised by dividing the input signal into wide bands with regard to a high-frequency area. As a typified example of the unequal-interval division, there exists an octave division in which the band gradually halves toward the low-frequency area, a critical band division that corresponds to an auditory feature of a human being, or the like. The technology relating to the band-division filter bank and its design method is disclosed in the Non-patent document 4.

The quantization unit 111 removes redundancy of the inputted signal, and outputs the encoded signal. As a method of removing redundancy, there exists the method of taking a control such that a correlation between the inputted signals is minimized. In addition, the signal component that is not auditorily recognized may be removed by utilizing the auditory feature such as a masking effect. As a quantization method, the quantization methods such as a linear quantization method and a non-linear quantization method are known. The redundancy of the quantized signal can be furthermore removed by employing Huffman coding etc.

A configuration example of the decoding unit 150 will be explained in details by making a reference to FIG. 3. The decoding unit 150 receives the main signal, and outputs the decoded signal. The decoding unit 150 is configured of an inverse quantization unit 160 and an inverse conversion unit 161. The inverse quantization unit 160 inverse-quantizes the received main signal of each frequency, and generates the first converted signal that is configured of a plurality of the frequency components. And, the inverse quantization unit 160 outputs the first converted signal to the inverse conversion unit 161. The inverse conversion unit 161 inverse-converts the first converted signal, and generates the decoded signal. And, the inverse conversion unit 161 outputs the decoded signal.

As an inverse conversion that the inverse conversion unit 161 applies, the inverse conversion corresponding to the conversion that the conversion unit 110 applies is preferably selected. For example, when the conversion unit 110 configures one block by collecting a plurality of the input signal samples, and applies the frequency conversion for this block, the inverse conversion unit 161 applies the corresponding inverse conversion for the samples of which number is identical. Further, when an overlap of each block is permitted at the moment that the conversion unit 110 configures one block by collecting a plurality of the input signal samples, the inverse conversion unit 161, responding to this, applies an identical overlap for the inverse-converted signal. In addition, when the conversion unit 110 is configured of the band-division filter bank, the inverse conversion unit 161 is configured of a band-synthesis filter bank. The technology relating to the band-synthesis filter bank and its design method is disclosed in the Non-patent document 4.

Figure 2:
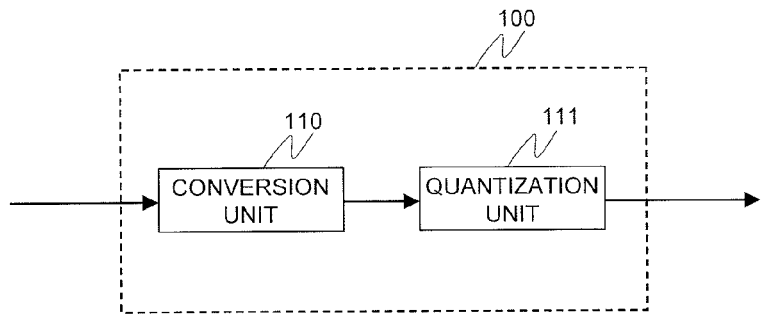
FIG. 2 shows a configuration example of an encoding unit 100.
Figure 3:
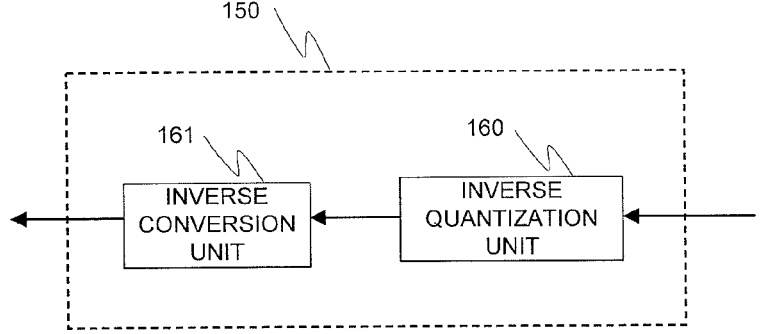
FIG. 3 shows a configuration example of a decoding unit 150.

While the encoding unit 100 of FIG. 2 and the decoding unit 150 of FIG. 3 were explained on the assumption that conversion/encoding having the conversion unit included therein was applied, a pulse code modulation (PCM), an adaptive differential pulse code modulation (ADPCM), and analysis-by-synthesis coding, which is typified by CELP etc., in addition hereto may be applied. The technology relating to the PCM/ADPCM is disclosed in the Non-patent document 2. Further, the technology relating to the CELP is disclosed in Non-patent document 5 (IEEE INTERNATIONAL CONFERENCE ON ACOUSTICS, SPEECH, AND SIGNAL PROCESSING, 25.1.1, March 1985, pp. 937-940).

Further, the encoding unit 100 may output the input signal as it stands to the multiplexing unit 102 without performing the encoding process therefor, and the decoding unit 150 may input the main signal as it stands into the signal control unit 151 without performing the decoding process therefor. This configuration makes it possible to eliminate the distortion of the signal accompanied by the encoding/decoding process. In addition, a configuration may be made so that the encoding unit 100 and the decoding unit 150 perform a distortion-less compression/expansion process. This configuration enables the signal control unit 151 to receive the decoded signal without distorting the input signal.

Figure 4:
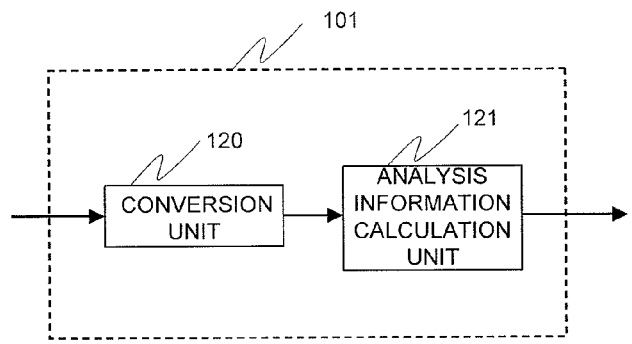
FIG. 4 shows a configuration example of a signal analysis unit 101.

A configuration example of the signal analysis unit 101 will be explained in details by making a reference to FIG. 4. The signal analysis unit 101 receives the input signal, and outputs the analysis information. The signal analysis unit 101 is configured of a conversion unit 120 and an analysis information calculation unit 121. The conversion unit 120 decomposes the received input signal into the frequency components, and generates the second converted signal. The conversion unit 120 outputs the second converted signal to the analysis information calculation unit 121. The analysis information calculation unit 121 decomposes the second converted signal into the component elements, and generates the analysis information indicative of a relation between a plurality of the component elements. At this time, the component element may correspond to the sound source. And, the analysis information calculation unit 121 outputs the analysis information. The analysis information may include component element control information, being information for controlling the component element. Further, the analysis information calculation unit 121 may decompose the second converted signal into component element groups each of which is configured of a plurality of the component elements, and calculate the analysis information. The signal analysis unit 101 may encode the analysis information when the redundancy exists in the analysis information. This makes it possible to minimize the redundancy of the analysis information. The technique of the conversion in the conversion unit 110 may be employed for the technique of the conversion in the conversion unit 120.

A configuration example of the signal control unit 151 will be explained in details by making a reference to FIG. 5. The signal control unit 151 receives the decoded signal and the analysis information, and outputs the output signal. The signal control unit 151 is configured of a conversion unit 171, a signal processing unit 172, and an inverse conversion unit 173. The conversion unit 171 decomposes the received decoded signal into the frequency components, and generates the second converted signal. The conversion unit 171 outputs the second converted signal to the signal processing unit 172. The signal processing unit 172 controls the second converted signal into the component elements corresponding to the sound source based upon the analysis information, changes a relation between a plurality of the component elements, and generates the modified decoded signal. And, the signal processing unit 172 outputs the modified decoded signal to the inverse conversion unit 173. Further, the signal processing unit 172 may decompose the second converted signal into component element groups each of which is configured of a plurality of the component elements, and change a relation between a plurality of the component elements. The signal processing unit 172 performs the above-mentioned process after finishing the decoding process in the case that the analysis information has been encoded in the analysis information calculation unit 121. The inverse conversion unit 173 inverse-converts the modified decoded signal, and generates the output signal. And, the inverse conversion unit 173 outputs the output signal. The technique of the inverse conversion in the inverse conversion unit 161 can be employed for the technique of the inverse conversion in the inverse conversion unit 173.

Hereinafter, an explanation will be made more detailedly by employing the input signal that is configured of objective sound and background sound as one example of the input signal that is configured of a plurality of the component elements. The signal analysis unit 101 receives the input signal that is configured of the objective sound and the background sound, calculates the suppression coefficient information indicative of a relation between the objective sound and the background sound, and outputs it as analysis information to the multiplexing unit 102. The suppression coefficient information is information that is caused to act upon the input signal that is configured of the objective sound and the background sound in order to suppress the background sound. Further, the signal control unit 151 receives the suppression coefficient information and the decoded signal, generates the output signal by controlling the objective sound and the background sound, and outputs it.

Figure 6:
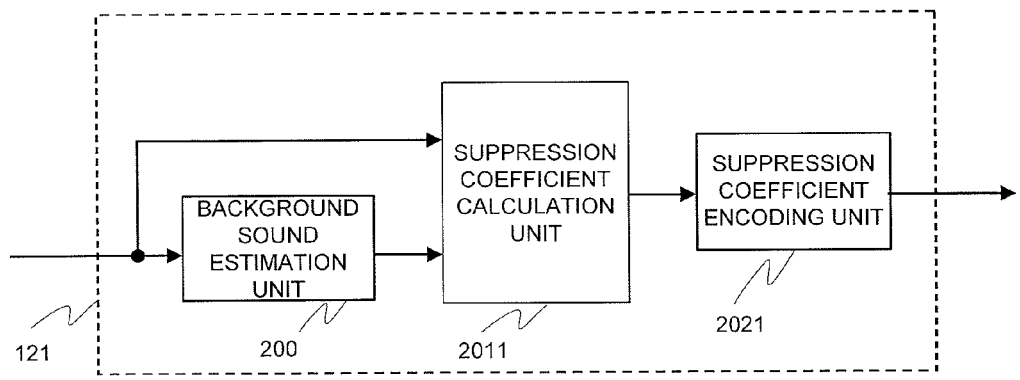
FIG. 6 shows a configuration example of an analysis information calculation unit 121.

Continuously, a configuration example of the analysis information calculation unit 121 will be explained in details by making a reference to FIG. 6. The analysis information calculation unit 121 receives the second converted signal, and outputs the suppression coefficient information as analysis information. The analysis information calculation unit 121 is configured of a background sound estimation unit 200, a suppression coefficient calculation unit 2011, and a suppression coefficient encoding unit 2021.

The background sound estimation unit 200 receives the second converted signal, estimates the background sound, and generates a background sound estimation result. The background sound estimation unit 200 outputs the background sound estimation result to the suppression coefficient calculation unit 2011. As a background sound estimation result, there exist an amplitude absolute value and an energy value of the background sound, an amplitude ratio and an energy ratio of the background sound and the input signal, an average value thereof, an interval maximum value, an interval minimum value, and so on.

The suppression coefficient calculation unit 2011 calculates the suppression coefficient for suppressing the background sound by employing the second converted signal and the background sound estimation result. And the suppression coefficient calculation unit 2011 outputs the suppression coefficient to the suppression coefficient encoding unit 2021. As a technology relating to the method of calculating the suppression coefficient, the method founded upon minimum mean square error short-time spectral amplitude (MMSE STSA), which is disclosed in Non-patent document 6 (IEEE TRANSACTIONS ON ACOUSTICS, SPEECH, AND SIGNAL PROCESSING, VOL. 32, NO. 6, pp. 1109-1121, December 1984), the method founded upon minimum mean square error log spectral amplitude (MMSE LSA), which is disclosed in Non-patent document 7 (IEEE TRANSACTIONS ON ACOUSTICS, SPEECH, AND SIGNAL PROCESSING, VOL. 33, NO. 2, pp. 443-445, April 1985), the method founded upon maximum likelihood spectral amplitude estimation, which is disclosed in Non-patent document 8 (EURASIP JOURNAL ON ADVANCES IN SIGNAL PROCESSING, VOLUME 2005, Issue 7, July 2005, pp. 1110-1126), or the like may be employed.

The suppression coefficient encoding unit 2021 encodes the suppression coefficient, and outputs an encoding result as suppression coefficient information. A method similar to the method having the content already explained in the quantization unit 111 may be employed for the encoding. The encoding makes it possible to remove the redundancy of the suppression coefficient. Further, when the information quantity does not need to be curtailed, the suppression coefficient encoding unit 2021 may output the suppression coefficient as suppression coefficient information without performing these encoding processes.

Figure 7:
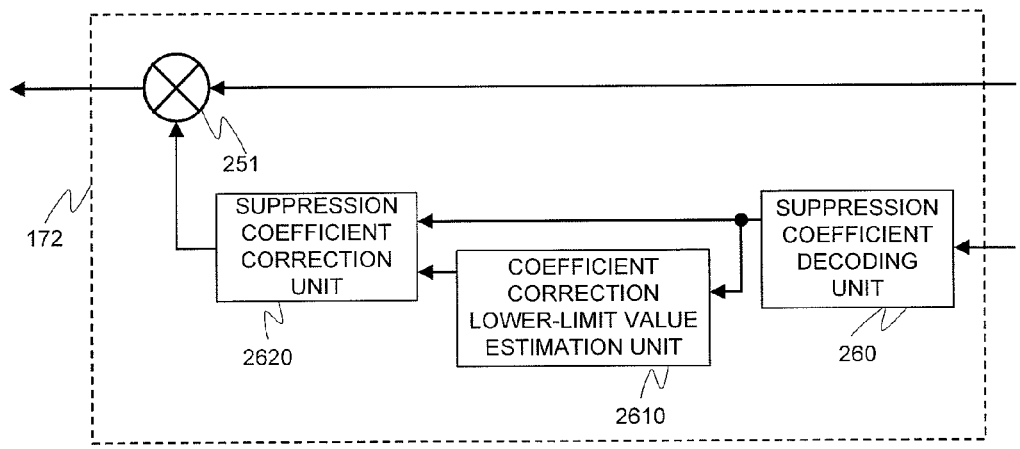
FIG. 7 shows a first configuration example of a signal processing unit 172.

A first configuration example of the signal processing unit 172 will be explained in details by making a reference to FIG. 7. The signal processing unit 172 receives the second converted signal, and the suppression coefficient information as analysis information, and outputs the modified decoded signal. The signal processing unit 172 is configured of a suppression coefficient decoding unit 260, a coefficient correction lower-limit value estimation unit 2610, a suppression coefficient correction unit 2620, and a multiplier 251.

The suppression coefficient decoding unit 260 decodes the suppression coefficient from the received suppression coefficient information, and outputs the suppression coefficient to the coefficient correction lower-limit value estimation unit 2610 and the suppression coefficient correction unit 2620. When the suppression coefficient has not been encoded, the suppression coefficient decoding unit 260 directly outputs the suppression coefficient without performing the decoding process.

The coefficient correction lower-limit value estimation unit 2610 estimates the correction value for correcting the suppression coefficient from the suppression coefficient. The correction value could be a coefficient correction lower-limit value. Hereinafter, the correction value will be explained as a coefficient correction lower-limit value. The coefficient correction lower-limit value estimation unit 2610 outputs the coefficient correction lower-limit value to the suppression coefficient correction unit 2620. The coefficient correction lower-limit value is indicative of a lower-limit value of the suppression coefficient. As a rule, a signal distortion that occurs after suppressing the background sound is increased when the suppression coefficient becomes too small. Thereupon, employing the coefficient correction lower-limit value makes it possible to avoid an excessive increase in the signal distortion. A specific value may be pre-stored in a memory as the coefficient correction lower-limit value in some cases, and the coefficient correction lower-limit value may be calculated responding to the suppression coefficient in some cases. Such a calculation includes a manipulation of selecting an appropriate value from among a plurality of values stored in a memory. The coefficient correction lower-limit value should be set so that it is a small value when the background sound estimation result is small. The reason is that the small background sound estimation result signifies that the objective sound is dominant in the input signal, and hence, the distortion hardly occurs at the moment of manipulating the component element. Hereinafter, the method of estimating the coefficient correction lower-limit value from the suppression coefficient will be explained in details.

As a first method of estimating the coefficient correction lower-limit value, the method of defining the value obtained by smoothing the suppression coefficient in a frequency direction as a coefficient correction lower-limit value may be employed. For example, the suppression coefficient of a frequency f in a certain time n is defined as $G(n,f)$, $f=0,\ldots,F-1$. At this time, a coefficient correction lower-limit value $L(f)$, $f=0,\ldots,F-1$ is calculated like [Numerical equation 1].

[Numerical equation 1]

$T1(n,0)=G(n,0)$, $T1(n,f)=\max(G(n,f), a(f) \times T1(n,f-1)), f=1,\ldots,F-1$, $T2(n,F-1)=T1(n,F-1)$, $T2(n,f)=\max(T1(n,f), b(f) \times T2(n,f+1)), f=F-2,\ldots,0$ $L(n,f)=c(f) \times T2(n,f), f=0,\ldots,F-1$ Where F is the number of the suppression coefficients in the frequency direction, and max(X,Y) is indicative of X or Y, which is larger. Each of T1(n,f) and T2(n,f) is an intermediate parameter, and each of a(f), b(f), and c(f) is, which is a parameter for the smoothing, assumes a value of 0 to 1. Additionally, each of a(f), b(f), and c(f) could be a parameter having an identical value in a frequency direction. For example, a(f), b(f), and c(f) are set to a(f)=0.8, b(f)=0.7, and c(f)=0.2, respectively.

As a second method of estimating the coefficient correction lower-limit value, a moving average in the frequency direction of the suppression coefficients G(n,f) can be employed. In this case, the coefficient correction lower-limit value behaves like the following equation.

$$L(n,f) = c(f) \cdot \frac{1}{M+1} \sum_{m=-M/2}^{m=M/2} w(m) \cdot G(n, f+m)$$ [Numerical equation 2]

Where w(m), which is a weighting of the moving average, can be set so that a sum of w(m) is 1. C(f), which is a parameter for the smoothing, assumes a value of 0 to 1. Additionally, c(f) could be a parameter having an identical value in the frequency direction. For example, c(f) is set to c(f)=0.2.

Further, as a third method of estimating the coefficient correction lower-limit value, the method of grouping suppression coefficients G(n,f) in a time direction and a frequency direction, or in one direction of them and defining a minimum value or an average value of the suppression coefficients within each group as a coefficient correction lower-limit value of the above group may be employed. The grouping in the frequency direction can be fitted to an auditory feature of a human being in such a manner that a small number of the suppression coefficients are grouped in a low-frequency band and a large number of the suppression coefficients are grouped in a high-frequency band. This grouping may be preset in some cases and may be calculated responding to the suppression coefficient in some cases.

Further, as a fourth method of estimating the coefficient correction lower-limit value, after the suppression coefficient is converted into a signal versus background sound ratio, the coefficient correction lower-limit value can be calculated from the signal versus background sound ratio. Hereinafter, a specific procedure of converting the suppression coefficient into the signal versus background sound ratio will be explained. Additionally, indexes n and f in the time and frequency direction of the suppression coefficient G(n,f) are omitted for simplification, so the suppression coefficient G(n,f) is defined as G. Upon defining the estimation value of the signal versus background sound ratio as R, the input signal as X, the objective sound as S, the background sound as N, and the background sound estimation value as N-hat, the following relation holds.

$X = S + N$ [Numerical equation 3]

$S = G \times X$ [Numerical equation 4]

$$R = \frac{S^2}{\hat{N}^2} \quad \text{[Numerical equation 5]}$$

R based upon this definition is known as a prior signal-to noise ratio (prior SNR) when the background sound is noise. Upon substituting [Numerical equation 3] and [Numerical equation 4] into [Numerical equation 5] with N-hat defined as N-hat=N, the following equation is yielded.

$$R = \frac{S^2}{(X-S)^2} = \frac{G^2}{1-G^2} \quad \text{[Numerical equation 6]}$$

Further, in the case of employing the following [Numerical equation 7] instead of [Numerical equation 5] as definition of the signal versus background sound ratio R, [Numerical equation 3] and [Numerical equation 4] are substituted into [Numerical equation 7] with N-hat defined as N-hat=N, and upon assuming that S and N have no relation to each other, the following [Numerical equation 8] is yielded.

$$R = \frac{S^2}{\hat{N}^2} \quad \text{[Numerical equation 7]}$$

$$R = \frac{1}{1-G^2} \quad \text{[Numerical equation 8]}$$

The signal versus background sound ratio R based upon this definition is known as a posterior signal-to noise ratio (posterior SNR) when the background sound is noise. The signal versus background sound ratio can be calculated from the suppression coefficient by employing [Numerical equation 6] or [Numerical equation 8].

As a method of calculating the coefficient correction lower-limit value from the signal versus background sound ratio, the method disclosed in the Patent document 1 may be employed. At first, the signal versus background sound ratios are grouped in the time direction and the frequency direction, or in one direction of them, an average value of the signal versus background sound ratios within each group is calculated as the average signal versus background sound ratio of the above group. Thereafter, the coefficient correction lower-limit value preset responding to the average signal versus background sound ratio is calculated. In addition, the grouping in the frequency direction may be fitted to an auditory feature of a human being in such a manner that a small number of the signal versus background sound ratios are grouped in a low-frequency band and a large number of the signal versus background sound ratios are grouped in a high-frequency band. This grouping may be preset in some cases and may be calculated responding to the suppression coefficient or the signal versus background sound ratio in some cases.

In addition, the coefficient correction lower-limit value calculated as mentioned above may be smoothed in the time direction. Further, the coefficient correction lower-limit value may be calculated by employing the suppression coefficient smoothed in the time direction and applying the above-mentioned smoothing method for it.

The suppression coefficient correction unit 2620 calculates the corrected suppression coefficient from the suppression coefficient and the coefficient correction lower-limit value, and outputs it to the multiplier 251. As a method of calculating the corrected suppression coefficient from the suppression coefficient and the coefficient correction lower-limit value, the method disclosed in the Patent document 1 may be employed. The method disclosed in the Patent document 1 is a method of comparing the suppression coefficient with the coefficient correction lower-limit value. When the suppression coefficient is larger than the coefficient correction lower-limit value, the suppression coefficient correction unit 2620 outputs the suppression coefficient as a corrected suppression coefficient. Further, when the suppression coefficient is smaller than the coefficient correction lower-limit value, the suppression coefficient correction unit 2620 outputs the coefficient correction lower-limit value as a corrected suppression coefficient.

The multiplier 251 multiplies the second converted signal by the corrected suppression coefficient, and generates the modified decoded signal. The multiplier 251 outputs the modified decoded signal.

Figure 8:
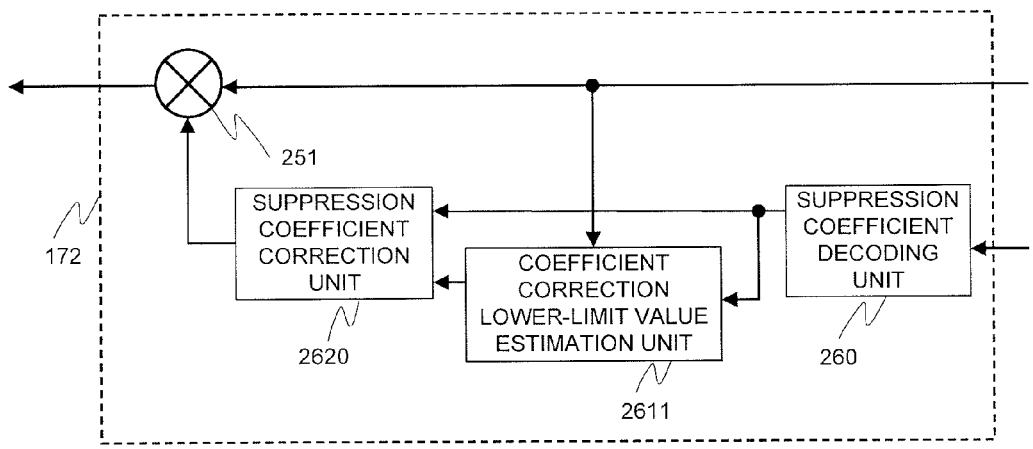
FIG. 8 shows a second configuration example of the signal processing unit 172.

Next, a second configuration example of the signal processing unit 172 will be explained in details by making a reference to FIG. 8. The signal processing unit 172 receives the second converted signal and the suppression coefficient information as analysis information, and outputs the modified decoded signal. The signal processing unit 172 is configured of a suppression coefficient decoding unit 260, a coefficient correction lower-limit value estimation unit 2611, a suppression coefficient correction unit 2620, and a multiplier 251. Upon comparing FIG. 8 with FIG. 7 indicative of the first configuration example of the signal processing unit 172, the coefficient correction lower-limit value estimation unit 2610 is replaced with the coefficient correction lower-limit value estimation unit 2611. Explanation of the portion which overlaps the first configuration example of the signal processing unit 172 shown in FIG. 7 is omitted, and the coefficient correction lower-limit value estimation unit 2611 will be explained.

The coefficient correction lower-limit value estimation unit 2611 estimates the coefficient correction lower-limit value from the suppression coefficient and the second converted signal, and outputs the coefficient correction lower-limit value to the suppression coefficient correction unit 2620. Similarly to the foregoing fourth method of estimating the coefficient correction lower-limit value, after the suppression coefficient is converted into the signal versus background sound ratio, the background sound is calculated from the signal versus background sound ratio and the second converted signal by employing [Numerical equation 7].

Further, the second converted signal may be employed when the signal versus background sound ratio is obtained. Upon assuming quantization error in the second converted signal as zero, the second converted signal is X. Thus, when [Numerical equation 4] is employed, the objective sound S is acquired. Herein, as a rule, it is S-hat, being an estimation value of S, that is acquired by employing [Numerical equation 4]. The reason is that, as a matter of fact, it is very rare that the suppression coefficient G is obtained as a perfect value. In general, error of the suppression coefficient causes a difference between S and S-hat to occur. Thus, S-hat is expressed as a sum of S and the residual background sound. Upon defining the residual background sound as $N_R$, $N_R$ can be estimated with a means similarly to that of N-hat. R can be obtained by substituting S and $N_R$ obtained in such a manner into [Numerical equation 5]. R obtained in such a manner, which is indicative of the signal versus background sound ratio after separating the objective sound and the background sound, becomes the signal versus background sound ratio of the signal to which a user listens. For this, employing the above-mentioned R makes it possible to obtain the coefficient correction lower-limit value that is more adaptable to user's perception.

In addition, a scheme of, after grouping the background sound in the time direction and the frequency direction, or in one direction of them, and calculating an average value of the background sound within each group as an average background sound of the above group, calculating the coefficient correction lower-limit value preset according to the average background sound may be employed. The grouping in the frequency direction can be fitted to an auditory feature of a human being in such a manner that a small number of the background sounds are grouped in a low-frequency band and a large number of the background sounds are grouped in a high-frequency band. This grouping may be preset in some cases, and may be calculated responding to the suppression coefficient, the signal versus background sound ratio, and the background sound in some cases.

Further, the analysis information explained above may be calculated as analysis information common to a plurality of the frequency bands. For example, the transmission unit 10 may divide the frequency band at an equal interval, and calculate the analysis information for each divided frequency band. In addition, the transmission unit 10 may calculate the analysis information to an auditory feature of a human being. That is, the transmission unit 10 may divide the low-frequency band at a fine interval and the high-frequency band at a coarse interval, and calculate the analysis information in a divided unit. This enables the information quantity of the analysis information to be curtailed.

As explained above, the first embodiment of the present invention enables the receiving unit to control the input signal, which is configured of a plurality of the component elements, for each component element based upon the analysis information of the input signal being outputted from the transmission unit. In addition, the receiving unit can curtail the arithmetic quantity relating to the signal analysis because the transmission unit analyses the signal. In addition, correcting the suppression coefficient by employing the coefficient correction lower-limit value makes it possible to avoid an increase in the signal distortion.

A second embodiment of the present invention will be explained in details by making a reference to FIG. 9. In the second embodiment of the present invention, the receiving unit 35, which assumes a configuration in which the signal control information can be received, can control a specific component element independently. Upon comparing the second embodiment shown in FIG. 9 with the first embodiment shown in FIG. 1, while the receiving unit 15 is configured of the signal control unit 151, the receiving unit 35 is configured of a signal control unit 350 in this embodiment. Further, in this embodiment, the transmission unit, the transmission path, and the receiving unit could be a recoding unit, a storage medium, and a reproduction unit, respectively. From now on, explanation of the portion which overlaps FIG. 1 is omitted.

Figure 10:
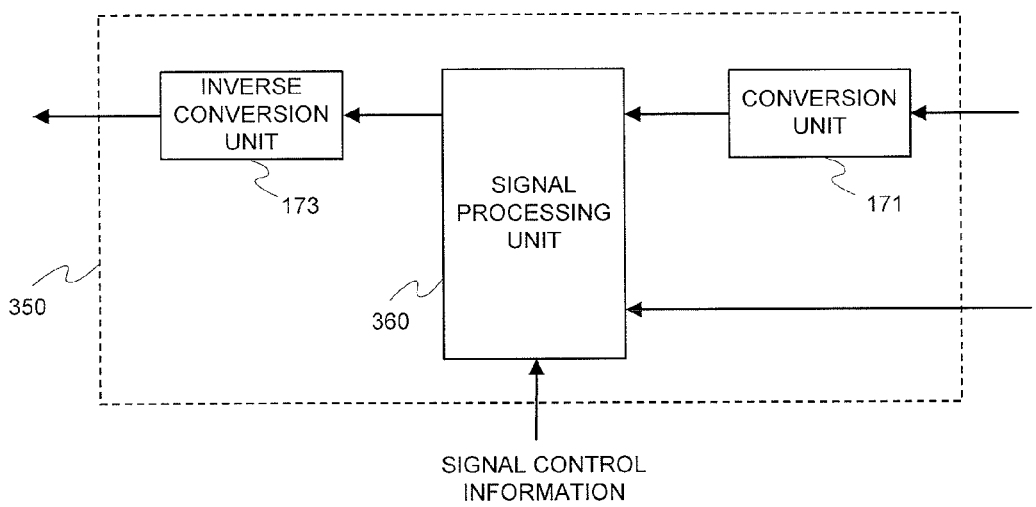
FIG. 10 shows a configuration example of a signal control unit 350.

A first configuration example of the signal control unit 350 will be explained in details by making a reference to FIG. 10. The signal control unit 350 is configured of a conversion unit 171, a signal processing unit 360, and an inverse conversion unit 173. Upon making a comparison with the first embodiment, while the signal control unit 151 is configured of the signal processing unit 172, the signal control unit 350 is configured of the signal processing unit 360 in this embodiment. The signal control unit 350 receives the decoded signal, the analysis information, and the signal control information, and outputs the output signal. The signal control unit 350 manipulates the decoded signal received from the decoding unit 150 for each component element based upon the signal control information and the analysis information. Further, the signal control unit 350 also can manipulate the decoded signal with the component element group, which is configured of a plurality of the component elements, defined as a unit instead of the component element. The signal processing unit 360 receives the second converted signal from the conversion unit 171 and the signal control information from the separation unit 152. In addition, the signal processing unit 360 receives the signal control information. And, the signal processing unit 360 controls the component element of the frequency component of the second converted signal based upon the analysis information and the signal control information, and generates the modified decoded signal. The signal processing unit 360 outputs the modified decoded signal to the inverse conversion unit 173.

In addition, specifically, the signal processing unit 360 derives a by-frequency analysis parameter based upon the analysis information. And, the signal processing unit 360 decomposes the second converted signal into the component elements based upon the analysis parameter. In addition, the signal processing unit 360 prepares the modified decoded signal in which a relation between of a plurality of the component elements has been changed, responding to the by-frequency analysis parameter based upon the signal control information. The signal processing unit 360 outputs the modified decoded signal to the inverse conversion unit 173. Further, the signal processing unit 360 may decompose the second converted signal based upon the analysis parameter for each component element group that is configured of a plurality of the component elements.

The signal control information is information for controlling each component element of the input signal frequency by frequency. That is, the signal control information is information for changing a relation between the component elements, for example, an energy level of the objective sound and the background sound in the case that the input signal is configured of the objective sound and the background sound. A configuration may be made so that the signal control information is inputted from the outside by a user. For example, as signal control information being inputted from the outside, there exists personal information such as a taste of the user pre-registered into the receiving unit, an operational status of the receiving unit (including external environment information such as a switched-off loudspeaker), a kind or a format of the receiving unit, a use status of a power source and a cell or its residual quantity, and a kind and a status of an antenna (a shape of being folded in, its direction, etc.). Further, a configuration may be made so that the signal control information is automatically captured in the other formats. A configuration may be made so that the signal control information is automatically captured via a sensor installed inside or near to the receiving unit. For example, as signal control information being automatically captured, there exists a quantity of the external noise, brightness, a time band, a geometric position, a temperature, information synchronous with video, barcode information captured through a camera, and so on.

Hereinafter, an explanation will be made more detailedly by employing the input signal that is configured of the objective sound and the background sound as one example of the input signal that is configured of a plurality of the component elements. The signal control unit 350 receives the signal control information, the suppression coefficient information, being analysis information, and the decoded signal, and generates the output signal by controlling the objective sound and the background sound, and outputs it. The suppression coefficient information is information that is caused to act upon the input signal that is configured of the objective sound and the background sound in order to suppress the background sound. Further, the signal control unit 350 controls the decoded signal by employing the suppression coefficient information.

Figure 11:
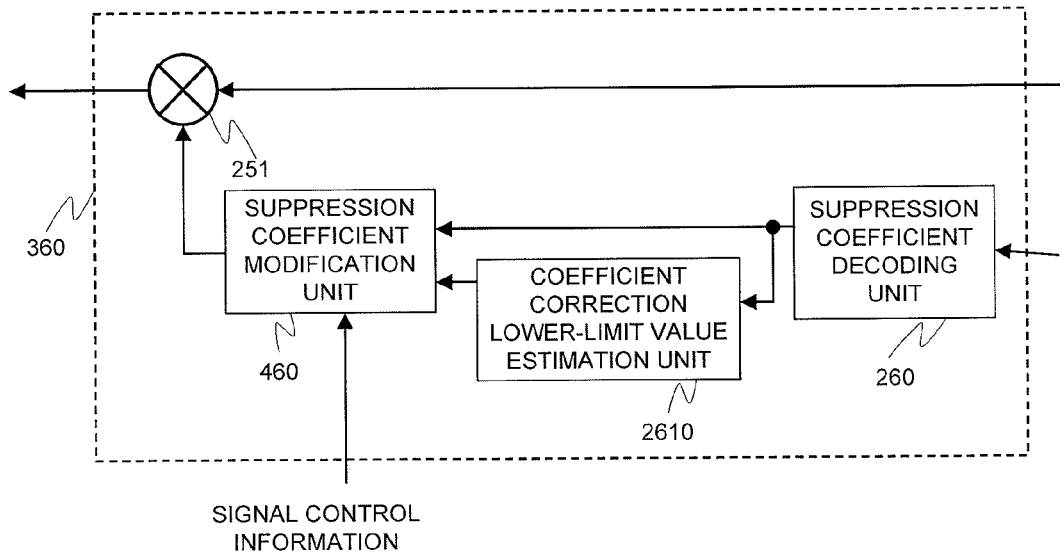
FIG. 11 shows a first configuration example of a signal processing unit 360.

Continuously, a configuration example of the signal processing unit 360 will be explained in details by making a reference to FIG. 11. The signal processing unit 360 receives the second converted signal, the suppression coefficient information, and the signal control information, and outputs the modified decoded signal. The signal processing unit 360 is configured of a suppression coefficient decoding unit 260, a coefficient correction lower-limit value estimation unit 2610, a suppression coefficient modification unit 460, and a multiplier 251. Upon comparing with the signal processing unit 172 explained by employing FIG. 7, the suppression coefficient correction unit 2620 is replaced with the suppression coefficient modification unit 460 in FIG. 11. From now on, explanation of the portion which overlaps FIG. 7 is omitted, and the suppression coefficient modification unit 460 will be explained.

The suppression coefficient modification unit 460 calculates the corrected suppression coefficient from the suppression coefficient and the coefficient correction lower-limit value, calculates the modified suppression coefficient by employing the signal control information inputted from the outside and modifying the corrected suppression coefficient, and outputs it.

Figure 12:
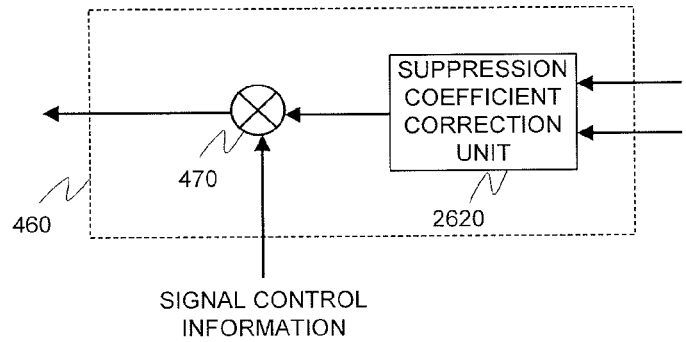
FIG. 12 shows a first configuration example of a suppression coefficient modification unit 460.

A first configuration example of the suppression coefficient modification unit 460 will be explained in details by making a reference to FIG. 12. The suppression coefficient modification unit 460 receives the suppression coefficient, the coefficient correction lower-limit value, and the signal control information, and outputs the modified suppression coefficient. The suppression coefficient modification unit 460 of this configuration example is configured of a suppression coefficient correction unit 2620 and a multiplier 470. The suppression coefficient correction unit 2620, as explained in the first embodiment, calculates the corrected suppression coefficient from the suppression coefficient and the coefficient correction lower-limit value, and outputs the corrected suppression coefficient to the multiplier 470. The multiplier 470 calculates a product of the corrected suppression coefficient and the signal control information, and outputs the modified suppression coefficient. In this configuration example, the signal control information is inputted as a magnification for the corrected suppression coefficient. Such a configuration makes it possible to control the corrected suppression coefficient with the simple signal control information.

Figure 13:
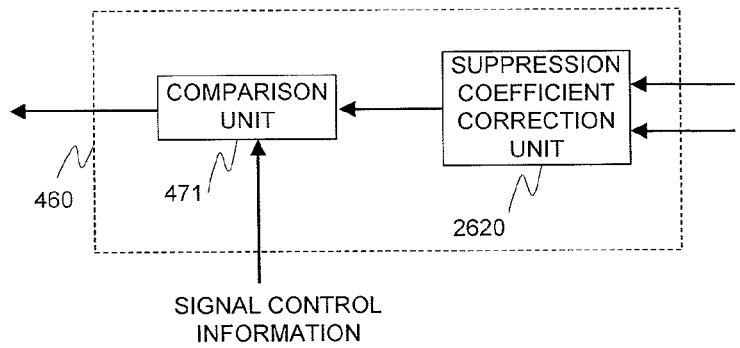
FIG. 13 shows a second configuration example of the suppression coefficient modification unit 460.

A second configuration example of the suppression coefficient modification unit 460 will be explained in details by making a reference to FIG. 13. The suppression coefficient modification unit 460 receives the suppression coefficient, the coefficient correction lower-limit value, and the signal control information, and outputs the modified suppression coefficient. The suppression coefficient modification unit 460 of this configuration example is configured of a suppression coefficient correction unit 2620 and a comparison unit 471. The suppression coefficient correction unit 2620, as explained in the first embodiment, calculates the corrected suppression coefficient from the suppression coefficient and the coefficient correction lower-limit value, and outputs the corrected suppression coefficient to the comparison unit 471. The comparison unit 471 compares the corrected suppression coefficient with the signal control information, and outputs the signal responding to its comparison result. For example, the comparison unit 471 outputs the corrected suppression coefficient or the signal control information, which is larger, when making a maximum comparison. Further, the comparison unit 471 may make a minimum comparison, and output the corrected suppression coefficient or the signal control information, which is smaller. In these cases, the maximum value or the minimum value of the corrected suppression coefficient is inputted as the signal control information. Such a configuration makes it possible to pre-specify a range of the output signal, and to avoid a decline in the sound quality due to the output of the unexpected signal.

Figure 14:
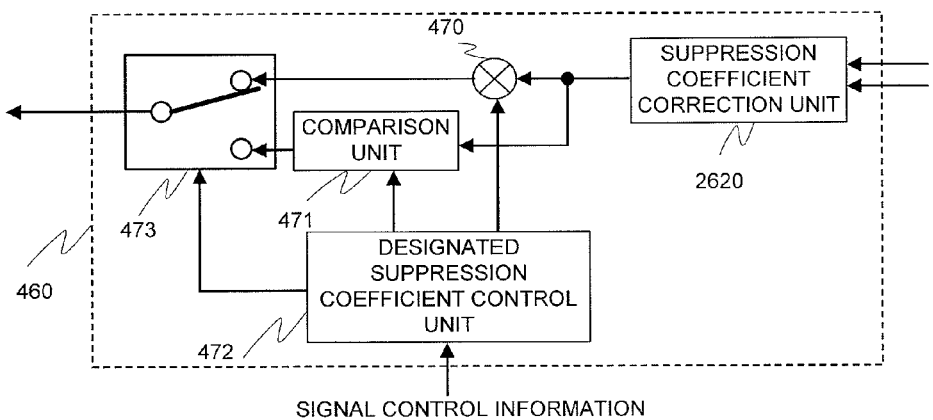
FIG. 14 shows a third configuration example of the suppression coefficient modification unit 460.

A third configuration example of the suppression coefficient modification unit 460 will be explained in details by making a reference to FIG. 14. The third configuration example of the suppression coefficient modification unit 460 is one obtained by combining the foregoing first configuration example and second configuration example. The suppression coefficient modification unit 460 receives the suppression coefficient, the coefficient correction lower-limit value, and the signal control information, and outputs the modified suppression coefficient. The suppression coefficient modification unit 460 of this configuration example is configured of a suppression coefficient correction unit 2620, a multiplier 470, a comparison unit 471, a designated suppression coefficient control unit 472, and a switch 473. The suppression coefficient correction unit 2620, as explained in the first embodiment, calculates the corrected suppression coefficient from the suppression coefficient and the coefficient correction lower-limit value, and outputs the corrected suppression coefficient to the multiplier 470 and the comparison unit 471. The designated suppression coefficient control unit 472 outputs the signal control information to the multiplier 470, the comparison unit 471, or the switch 473. Herein, the signal control information includes at least a magnification of the corrected suppression coefficient being used in the multiplier 470 and the maximum value or the minimum value of the suppression coefficient being used in the comparison unit 471. In addition, the signal control information may include the control information for selection being made by the switch 473. The designated suppression coefficient control unit 472 outputs a magnification of the corrected suppression coefficient to the multiplier 470 when receiving a magnification of the corrected suppression coefficient as signal control information. The multiplier 470 calculates a product of the corrected suppression coefficient and a magnification of the corrected suppression coefficient, and outputs the modified suppression coefficient to the switch 473. The designated suppression coefficient control unit 472 outputs the maximum value or the minimum value of the suppression coefficient to the comparison unit 471 when receiving the maximum value or the minimum value of the suppression coefficient as signal control information. The comparison unit 471 compares the corrected suppression coefficient with the maximum value or the minimum value of the suppression coefficient, and outputs the signal responding to its comparison result as a modified suppression coefficient to the switch 473. The designated suppression coefficient control unit 472 receives the control information for the selection, and output the control information to the switch 473. The switch 473 selects and outputs one of an output of the multiplier 470 and an output of the comparison unit 471 responding to the signal control information inputted from the designated suppression coefficient control unit 472.

In the third configuration example of suppression coefficient modification unit 460, a function of obtaining the modified suppression coefficient by causing the magnification to act upon the corrected suppression coefficient, and a function of obtaining the modified suppression coefficient by causing the maximum value and the minimum value of suppression coefficient to act upon the corrected suppression coefficient may be appropriately selected with the signal control information in order to obtain the modified suppression coefficient. This configuration makes it possible to realize effects of the first configuration example and the second configuration example in all.

Figure 15:
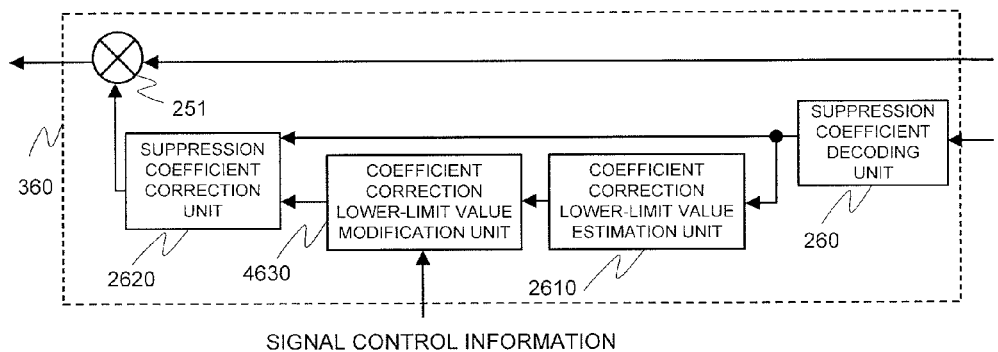
FIG. 15 shows a second configuration example of the signal processing unit 360.

Continuously, a second configuration example of the signal processing unit 360 will be explained in details by making a reference to FIG. 15. The signal processing unit 360 receives the second converted signal, the suppression coefficient information, and the signal control information, and outputs the modified suppression coefficient. The signal processing unit 360 is configured of a suppression coefficient decoding unit 260, a coefficient correction lower-limit value estimation unit 2610, a coefficient correction lower-limit value modification unit 4630, a suppression coefficient correction unit 2620, and a multiplier 251. This configuration differs from the foregoing configuration of FIG. 11 in a point that, while the suppression coefficient was modified with the signal control information in the latter, the coefficient correction lower-limit value is modified with the signal control information in the former. Accompanied therewith, the signal processing unit 360 calculates the modified suppression coefficient from the suppression coefficient and the modified coefficient correction lower-limit value. Further, upon comparing with the signal processing unit 172 explained by employing FIG. 7, the coefficient correction lower-limit value modification unit 4630 is added in FIG. 15. From now on, explanation of the portion which overlaps FIG. 7 is omitted, and the coefficient correction lower-limit value modification unit 4630 will be explained.

The coefficient correction lower-limit value modification unit 4630 modifies the coefficient correction lower-limit value by employing the signal control information inputted from the outside. Hereinafter, the method of modifying the coefficient correction lower-limit value will be explained. The small suppression coefficient allows the background sound to be strongly suppressed, and simultaneously therewith, allows one part of the objective sound to be also suppressed. That is, as a rule, the residual background sound and magnitude of the distortion of the output signal are in a relation of trade-off, and the small residual background sound and the small distortion of the output signal cannot be satisfied simultaneously. For this, employing the excessively small suppression coefficient leads to an increase in the distortion, which is included in the objective sound that is outputted. Thereupon, there is a necessity for guaranteeing the minimum value of the suppression coefficient with the coefficient correction lower-limit value, and settling the maximum value of the distortion occurring in the output signal into a constant range. Thereupon, it is necessary to accept one of two options, tacit permission of the residual background sound to a certain extent in order to avoid an increase in the distortion of the output signal due to the excessive suppression, and tacit permission of the distortion of the output signal due to the excessive suppression in order to attain the sufficiently small residual background sound. The coefficient correction lower-limit value is employed in order to control this trade-off. Thus, modifying the coefficient correction lower-limit value with the signal control information makes it possible to control the trade-off of the residual background sound and magnitude of the distortion of the output signal. With such a configuration, the suppression coefficient can be easily controlled with the signal control information.

Figure 34:
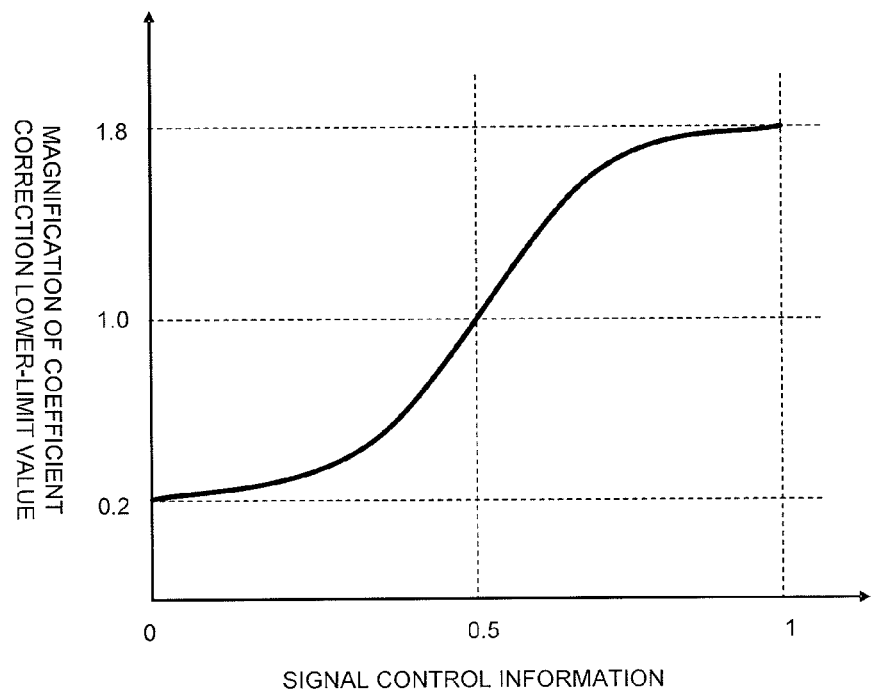
FIG. 34 is a view illustrating a relation of a magnification of a coefficient correction lower-limit value to signal control information.
Figure 34:
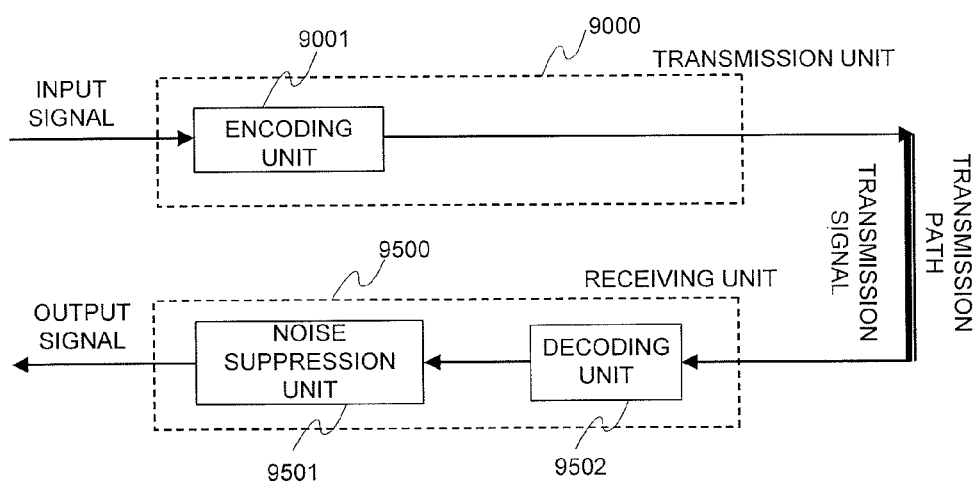

In this configuration example, for example, the magnitude of the residual background sound that is permissible as signal control information may be inputted. In this case, by generating the magnification of the coefficient correction lower-limit value from the magnitude of the permissible residual background sound, and multiplying the coefficient correction lower-limit value by the magnification of the coefficient correction lower-limit value, the coefficient correction lower-limit value may be modified. One example of a relation between the magnification of the coefficient correction lower-limit value and the signal control information in this case is shown in FIG. 34. The relation shown in FIG. 34 has a feature of ever-rising such that the magnification of the coefficient correction lower-limit value becomes larger as the signal control information becomes larger. The coefficient correction lower-limit value is amplified and utilized when the magnification of the coefficient correction lower-limit value is large. For this, it becomes equivalent to employment of the larger coefficient correction lower-limit value.

That is, the larger residual noise is permitted, and the distortion of the output signal is made small. To the contrary, when the magnification of the coefficient correction lower-limit value is large, the effect of the coefficient correction lower-limit value is made feeble. This means that stronger suppression is executed. In FIG. 34, the fact that signal control information is 1 signifies the situation in which the residual background sound is permitted, and thus, the distortion of the output signal becomes minimized. On the other hand, the fact that the signal control information is zero signifies the situation in which the distortion of the output signal is permitted, and thus, the residual background sound becomes minimized.

Figure 16:
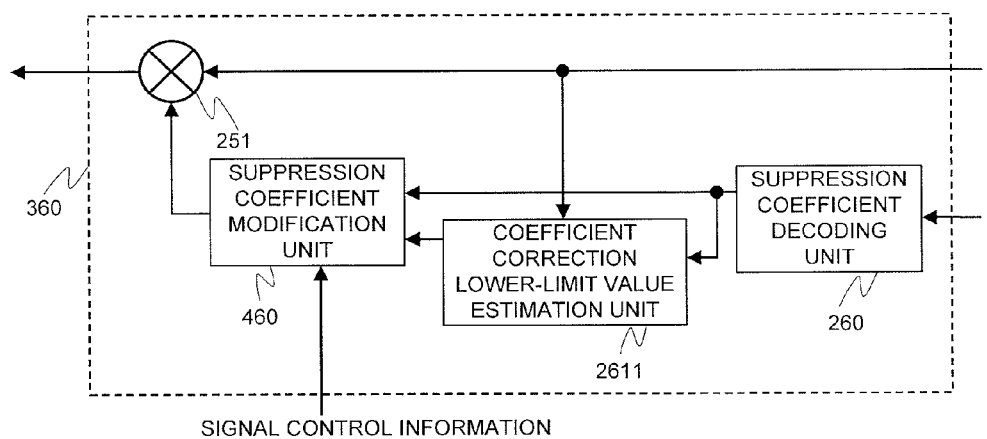
FIG. 16 shows a third configuration example of the signal processing unit 360.

Continuously, a third configuration example of the signal processing unit 360 will be explained in details by making a reference to FIG. 16. The signal processing unit 360 receives the second converted signal, the suppression coefficient information, and the signal control information, and outputs the modified suppression coefficient. The signal processing unit 360 is configured of a suppression coefficient decoding unit 260, a coefficient correction lower-limit value estimation unit 2611, a suppression coefficient modification unit 460, and a multiplier 251. This configuration differs from the configuration of FIG. 11 mentioned above in a point that the coefficient correction lower-limit value estimation unit 2610 is replaced with the coefficient correction lower-limit value estimation unit 2611. Explanation of the portion which overlaps FIG. 11 is omitted. Further, coefficient correction lower-limit value estimation unit 2611, as explained in the first embodiment, estimates the coefficient correction lower-limit value from the suppression coefficient and the second converted signal, and outputs the coefficient correction lower-limit value to the suppression coefficient modification unit 460.

Figure 17:
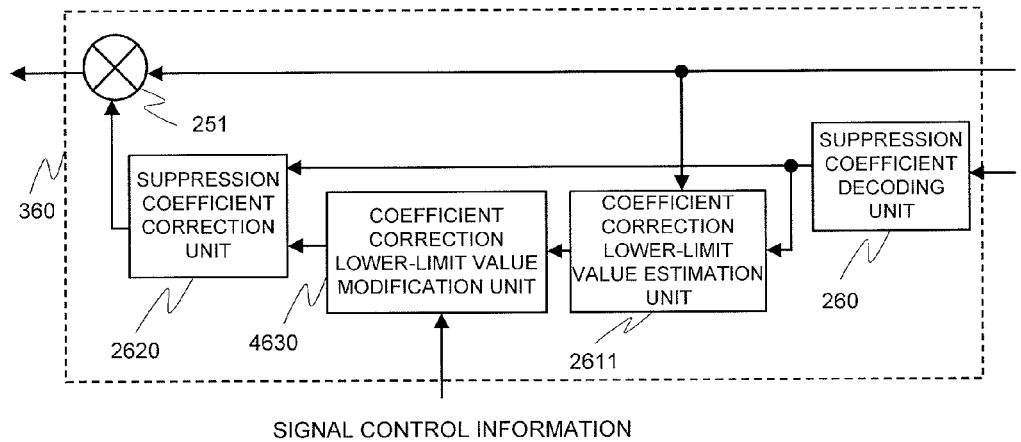
FIG. 17 shows a fourth configuration example of the signal processing unit 360.

Continuously, a fourth configuration example of the signal processing unit 360 will be explained in details by making a reference to FIG. 17. The signal processing unit 360 receives the second converted signal, the suppression coefficient information, and the signal control information, and outputs the modified suppression coefficient. The signal processing unit 360 is configured of a suppression coefficient decoding unit 260, a coefficient correction lower-limit value estimation unit 2611, a coefficient correction lower-limit value modification unit 4630, a suppression coefficient correction unit 2620, and a multiplier 251. This configuration differs from the configuration of FIG. 15 mentioned above in a point that the coefficient correction lower-limit value estimation unit 2610 is replaced with the coefficient correction lower-limit value estimation unit 2611. Explanation of the portion which overlaps FIG. 15 is omitted. Further, the coefficient correction lower-limit value estimation unit 2611, as explained in the first embodiment, estimates the coefficient correction lower-limit value from the suppression coefficient and the second converted signal, and outputs the coefficient correction lower-limit value to the suppression coefficient modification unit 4630.

The second embodiment of the present invention makes it possible to independently control only a specific component element based upon the signal control information received by the receiving unit. Further, the transmission unit can analyze the signal, and the receiving unit can control the input signal, which is configured of a plurality of the component elements, for each component. In addition, the receiving unit can curtail the arithmetic quantity relating to the signal analysis because the transmission unit analyses the signal.

Figure 18:
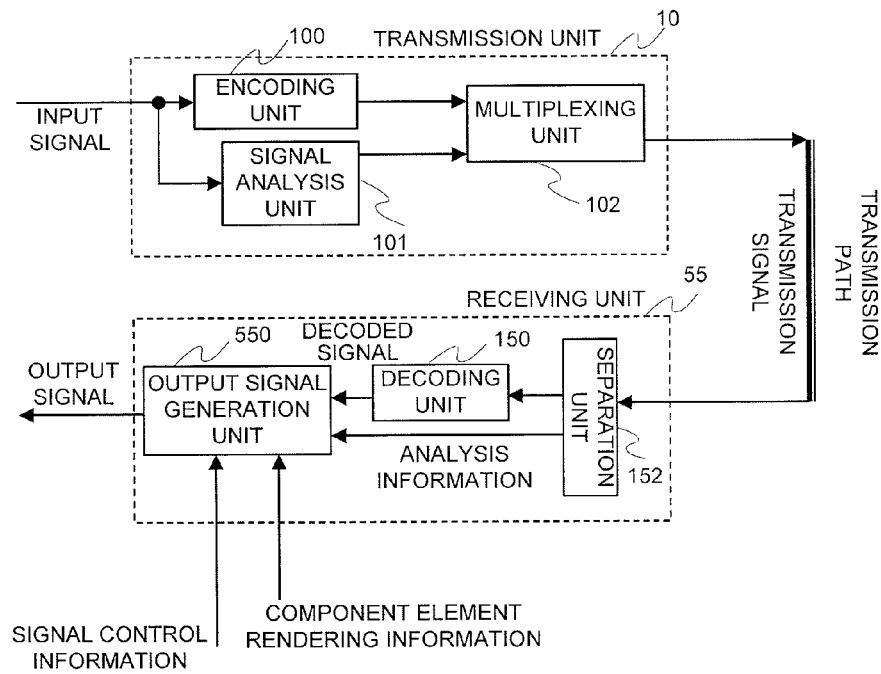
FIG. 18 is a block diagram illustrating a third embodiment of the present invention.

A third embodiment of the present invention will be explained by making a reference to FIG. 18. Upon comparing FIG. 18 with FIG. 9 indicative of the second embodiment, the former differs from the latter in a point that the receiving unit 35 is replaced with a receiving unit 55 in FIG. 18. The receiving unit 55, into which the transmission signal, the signal control information, and the component element rendering information are inputted, outputs the output signal that is configured of a plurality of the output channels. Upon making a comparison with the second embodiment, the third embodiment differs in a point of having the component element rendering information as well as an input, and a point that the output signal is a signal that is configured of a plurality of the output channels.

The so-called component element rendering information is information for outputting the component elements of the input signal to a plurality of the output channels. That is, the so-called component element rendering information is information indicating a relation between the component element being included in the decoded signal and the output signal of the receiving unit 55 for each frequency component. For example, it is indicative of localization information of each of the component elements being mixed in the decoded signal. It may include information for manipulating localization feeling, for example, by shading-off the sound image.

Utilizing the component element rendering information makes it possible to control the signal outputted to each output channel for each component element. Each component element may be output from a specific one output channel (for example, a loudspeaker) in some cases, and may be distributed and outputted to a plurality of the output channels in some cases. For example, outputting the objective sound only from a specific output channel and outputting the background sound from the other output channels when the component elements are the objective sound and the background sound makes it possible to clearly localize the objective sound and to improve realistic sensation by environmental sound.

Figure 9:
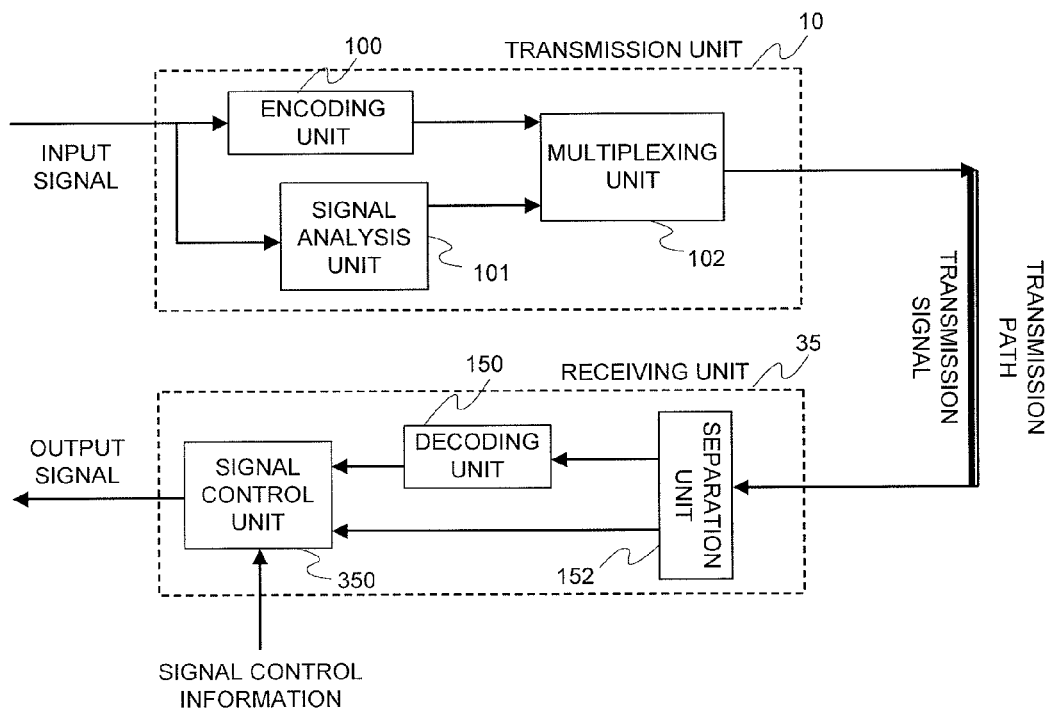
FIG. 9 is a block diagram illustrating a second embodiment of the present invention.

Upon making a comparison with the receiving unit 35 of FIG. 9 explained in the second embodiment, the receiving unit 55 differs in a point that the signal control unit 350 is replaced with an output signal generation unit 550. The component element rendering information as well besides the decoded signal, the analysis information, and the signal control information is inputted into the output signal generation unit 550.

Figure 19:
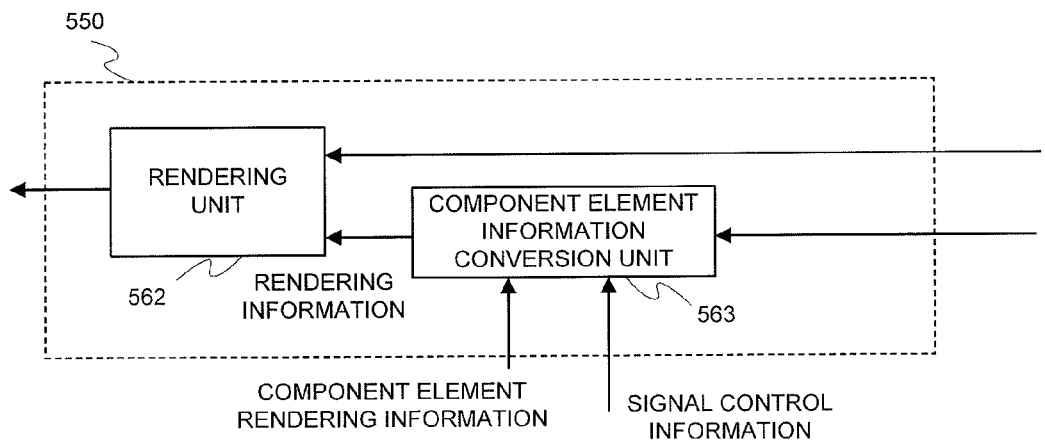
FIG. 19 shows a configuration example of an output signal generation unit 550.

A configuration example of the output signal generation unit 550, which is characteristic of this embodiment, will be explained by making a reference to FIG. 19 with the input signal, in which the objective sound and the background sound coexist, exemplified. The output signal generation unit 550 is configured of a component element information conversion unit 563, and a rendering unit 562.

Figure 20:
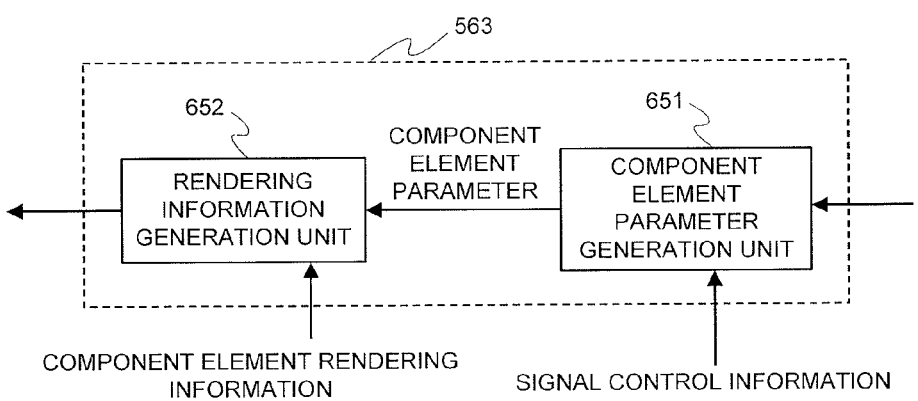
FIG. 20 shows a configuration example of a component element information conversion unit 563.

A configuration example of the component element information conversion unit 563 is shown in FIG. 20. The component element information conversion unit 563 is configured of a component element parameter generation unit 651, and a rendering information generation unit 652. The component element information conversion unit 563 calculates the rendering information from the analysis information, the signal control information, and the component element rendering information, and outputs the rendering information. Hereinafter, configurations of the component element parameter generation unit 651 and the rendering information generation unit 652 will be explained in details with the input signal, which is configured of the objective sound and the background sound, targeted as an example of the case that the analysis information is suppression coefficient information.

At first, the component element parameter generation unit 651 decodes the suppression coefficient from the suppression coefficient information. Next, the component element parameter generation unit 651 estimates the coefficient correction lower-limit value from the suppression coefficient. And, the component element parameter generation unit 651 generates the corrected suppression coefficient responding to each frequency component from the suppression coefficient and the coefficient correction lower-limit value. Thereafter, the component element parameter generation unit 651 calculates the component element parameter based upon the signal control information and the corrected suppression coefficient, and outputs it to the rendering information generation unit 652. Additionally, the method of estimating the coefficient correction lower-limit value and the method of calculating the corrected suppression coefficient were already explained in the first embodiment.

As a specific example of the component element parameter, upon defining the corrected suppression coefficient corresponding to each frequency component of a frequency band f as $g_i(f)$, i=1, 2, ..., P (P is the number of the channels of the decoded signal), the signal control information for controlling the objective sound as $A_{main}(f)$, and the signal control information for controlling the background sound as $A_{sub}(f)$, a component element parameter H(f) is expressed with the following equation.

$$H(f) = \begin{bmatrix} A_{main}(f) & 0 \\ 0 & A_{sub}(f) \end{bmatrix} \begin{bmatrix} g_1(f) & \cdots & g_P(f) \\ 1-g_1(f) & \cdots & 1-g_P(f) \end{bmatrix}$$

[Numerical equation 9]

The rendering information generation unit 652 outputs the rendering information indicating a relation between the decoded signal and the output signal based upon the component element parameter H(f) and the component element rendering information U(f). As a specific example, the rendering information W(f) can be defined as W(f)=U(f)×H(f).

Additionally, the rendering information, which is information indicating a relation between the modified decoded signal and the output signal of the output signal generation unit 550 for each frequency component, can be expressed by employing an energy differences, a time difference, a correlation between the signals, etc. As one example of the rendering information, the information disclosed in Non-patent document 9 (ISO/IEC 23003-1: 2007 Part 1 MPEG Surround) is known.

Further, as another configuration example of the component element information conversion unit 563, the component element parameter generation unit 651 and the rendering information generation unit 652 in FIG. 20 can be also integrated. In this case, the integrated unit generates the rendering information from the suppression coefficient information, the signal control information, and the component element rendering information, and outputs it. At first, the integrated unit decodes the suppression coefficient from the suppression coefficient information. Next, the integrated unit estimates the coefficient correction lower-limit value from the suppression coefficient, and generates the corrected suppression coefficient responding to each frequency component based upon the suppression coefficient and the coefficient correction lower-limit value. And, the integrated unit calculates the rendering information from the corrected suppression coefficient, the signal control information, and the component element rendering information, and outputs the rendering information. As a specific example, the rendering information W(f) can be expressed with the following equation.

$$W(f) = U(f) \cdot \begin{bmatrix} A_{main}(f) & 0 \\ 0 & A_{sub}(f) \end{bmatrix}$$ [Numerical equation 10]

$$\begin{bmatrix} g_1(f) & \cdots & g_P(f) \\ 1-g_1(f) & \cdots & 1-g_P(f) \end{bmatrix}$$

In addition, at the moment of calculating the rendering information from the suppression coefficient information, the signal control information, and the component element rendering information, after the component element information conversion unit 563 modifies the coefficient correction lower-limit value with the signal control information as explained in the second embodiment, it can calculate the modified suppression coefficient from the modified coefficient correction lower-limit value and the suppression coefficient, and calculate the rendering information by employing the modified suppression coefficient and the component element rendering information. In this case, upon defining the modified suppression coefficient as $g_i'(f)$, i=1, 2, ..., P (P is the number of the channels of the decoded signal), the rendering information W(f) behaves like the following equation.

$$W(f) = U(f) \cdot \begin{bmatrix} g_1'(f) & \cdots & g_P'(f) \\ 1-g_1'(f) & \cdots & 1-g_P'(f) \end{bmatrix}$$ [Numerical equation 11]

Making such a configuration makes it possible to incorporate the information for controlling each component element, which is included in the decoded signal, into the rendering information.

The rendering unit 562 converts the decoded signal and generates the output signal by employing the rendering information outputted from component element information conversion unit 563, and outputs it as an output signal of the output signal generation unit 550.

As a method of the conversion, the method disclosed in the Non-patent document 9 is known. When a MPEG Surround decoder disclosed in the Non-patent document 9 is employed, a data stream being supplied to the MPEG Surround decoder is outputted as rendering information. Additionally, the parameter being used within the MPEG Surround decoder may be supplied to the rendering unit without being converted into the data stream.

Upon defining the frequency component of the decoded signal in a certain frequency band f as $X_k(f)$, k=1, 2, ..., P (P is the number of the channels of the decoded signal), and the frequency component of the output signal as $V_k(f)$, k=1, 2, ..., Q (Q is the number of the channels of the output signal), and expressing X(f) by the following [Numerical equation 12] and V(f) by the following [Numerical equation 13], an operation of the rendering unit becomes V(f)=W(f)×X(f).

$$X(f) = \begin{bmatrix} X_1(f) \\ X_2(f) \\ \vdots \\ X_P(f) \end{bmatrix}$$ [Numerical equation 12]

$$V(f) = \begin{bmatrix} V_1(f) \\ V_2(f) \\ \vdots \\ V_Q(f) \end{bmatrix}$$ [Numerical equation 13]

As explained above, the third embodiment of the present invention enables the receiving unit to control the input signal independently for each component element of the input signal based upon the analysis information. Further, the localization of each component element can be controlled based upon the component element rendering information. Further, only a specific component element can be also controlled independently based upon the signal control information. A specific sound source can be controlled independently when the input signal is configured of a plurality of the sound sources.

In addition, the receiving unit can curtail the arithmetic quantity relating to the calculation of the analysis information because the transmission unit calculates the analysis information.

A fourth embodiment of the present invention is for incorporating the signal control information for controlling separation of the signal, namely, for independently controlling the component element into the component element rendering information. The fourth embodiment of the present invention will be explained by making a reference to FIG. 21. Upon comparing FIG. 21 with FIG. 18 indicative of the third embodiment, the former differs from the latter in a point that the receiving unit 55 of FIG. 18 is replaced with a receiving unit 75 in FIG. 21. The receiving unit 75, into which the transmission signal and the component element rendering information are inputted, outputs the signal, which is configured of a plurality of the output channels, as an output signal. The receiving unit 75 differs from the receiving unit 55 of the third embodiment in a point of not having the signal control signal as an input, and a point that the output signal generation unit 550 is replaced with an output signal generation unit 750. Additionally, the component element rendering information of this embodiment may include the information for manipulating each component element that is included in the decoded signal. The output signal generation unit 750 can manipulate the decoded signal with the component element group, which is configured of a plurality of the component elements, defined as a unit instead of each component element. Further, the signal could be a signal that is configured of a plurality of the general sound sources. Hereinafter, a configuration example of the output signal generation unit 750, which is characteristic of this embodiment, will be explained.

Figure 21:
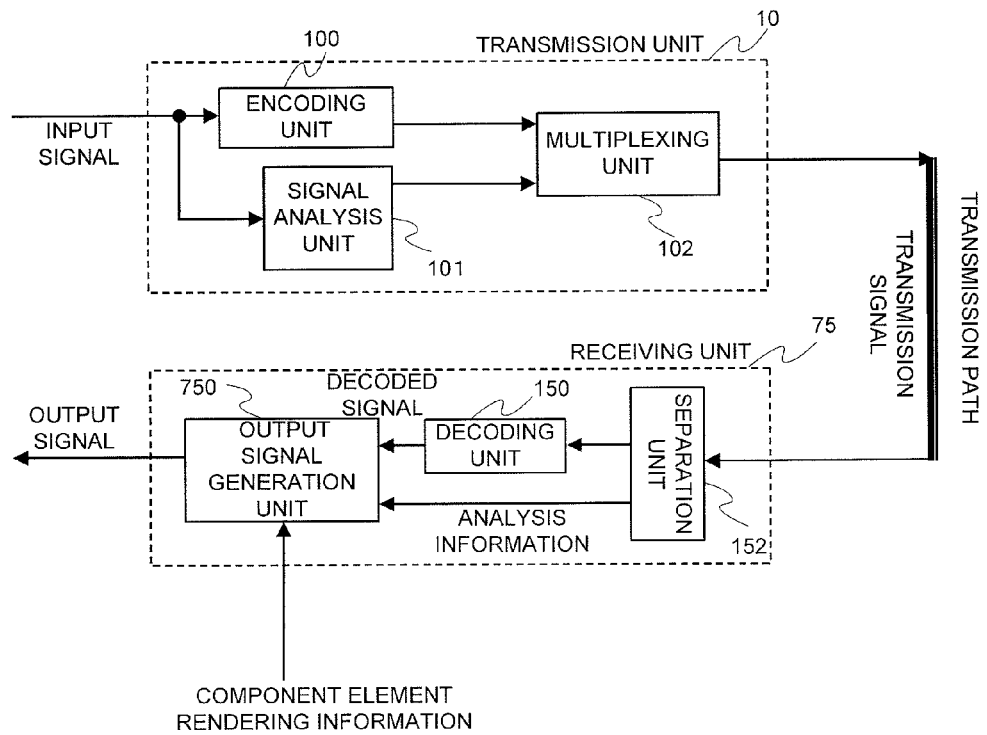
FIG. 21 is a block diagram illustrating a fourth embodiment of the present invention.
Figure 22:
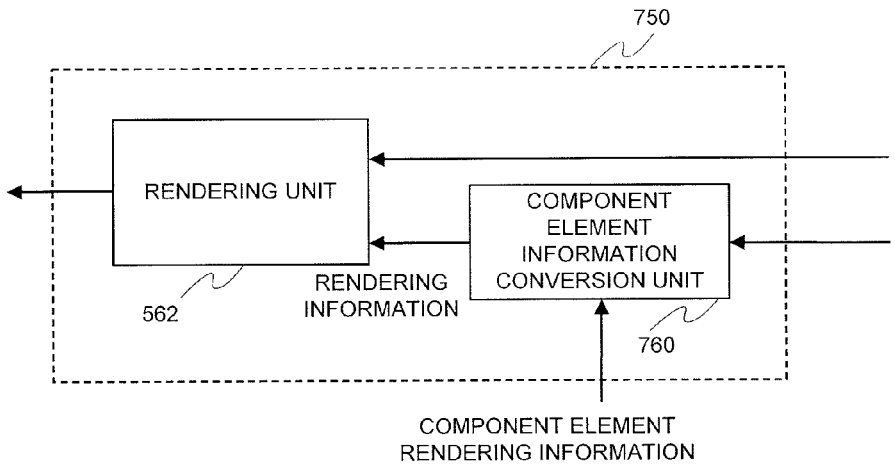
FIG. 22 shows a configuration example of an output signal generation unit 750.

In FIG. 22, a configuration example of the output signal generation unit 750 of FIG. 21 is shown. The output signal generation unit 750 is configured of a component element information conversion unit 760 and a rendering unit 562. The output signal generation unit 750 differs from the output signal generation unit 550 shown in FIG. 19 of the third embodiment in a point that the component element information conversion unit 563 is replaced with the component element information conversion unit 760. Hereinafter, a configuration example of the component element information conversion unit 760 will be explained.

Figure 23:
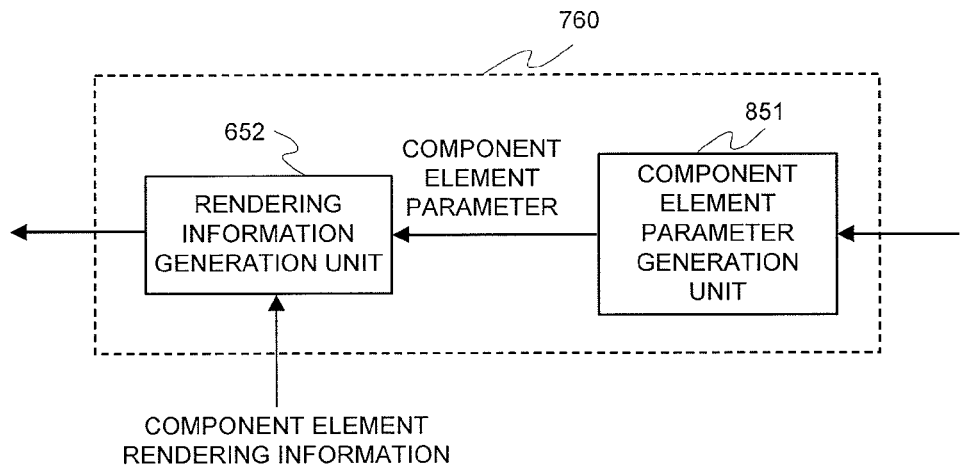
FIG. 23 shows a configuration example of a component element information conversion unit 760.

The component element information conversion unit 760 calculates the rendering information from the analysis information and component element rendering information, and outputs the rendering information. Hereinafter, a configuration example of the component element information conversion unit 760 will be explained by making a reference to FIG. 23 with the input signal, which is configured of a plurality of the sound sources, and the objective sound and the background sound, targeted as an example of the case that the analysis information is suppression coefficient information. The component element information conversion unit 760 is configured of a component element parameter generation unit 851 and a rendering information generation unit 652. Additionally, the signal analysis unit 101 of the transmission unit 10 calculates the suppression coefficient information. The signal analysis unit 101 in the case of employing the suppression coefficient information as analysis information was explained in details in the first embodiment, so its explanation is omitted.

The component element parameter generation unit 851 receives the suppression coefficient information, and decodes the suppression coefficient information. And, the component element parameter generation unit 851 calculates the suppression coefficient corresponding to each frequency component based upon the suppression coefficient information, and estimates the coefficient correction lower-limit value from the suppression coefficient. In addition, the component element parameter generation unit 851 calculates the corrected suppression coefficient from the suppression coefficient and the coefficient correction lower-limit value, and outputs the corrected suppression coefficient to the rendering information generation unit 652 as a component element parameter. Additionally, the method of estimating the coefficient correction lower-limit value and the method of calculating the corrected suppression coefficient were already explained in the first embodiment.

As a specific example of this conversion, upon defining the corrected suppression coefficient corresponding to each frequency component of the frequency band f as $g_i(f)$, a component element parameter H(f) is equivalent to the case that $A_{main}(f)=1$ and $A_{sub}(f)=1$ in [Numerical equation 9]. That is, it behaves like [Numerical equation 14].

$$H(f) = \begin{bmatrix} g_1(f) & \dots & g_P(f) \\ 1-g_1(f) & \dots & 1-g_P(f) \end{bmatrix}$$ [Numerical equation 14]

The rendering information generation unit 652 was already explained in the third embodiment by employing FIG. 20, so its explanation is omitted.

This configuration example is characterized in incorporating the information for taking a control for each component element into the rendering information, and realizing the manipulation for each component element in the rendering unit 562. For this, the kind of pieces of the information for taking a control is curtailed and the control becomes easy.

As explained above, the fourth embodiment of the present invention enables the receiving unit to control the input signal independently for each component element of the input signal based upon the analysis information. In addition, the localization of each component element can be controlled based upon the component element rendering information.

In addition, the receiving unit can curtail the arithmetic quantity relating to the calculation of the analysis information because the transmission unit calculates the analysis information.

Figure 24:
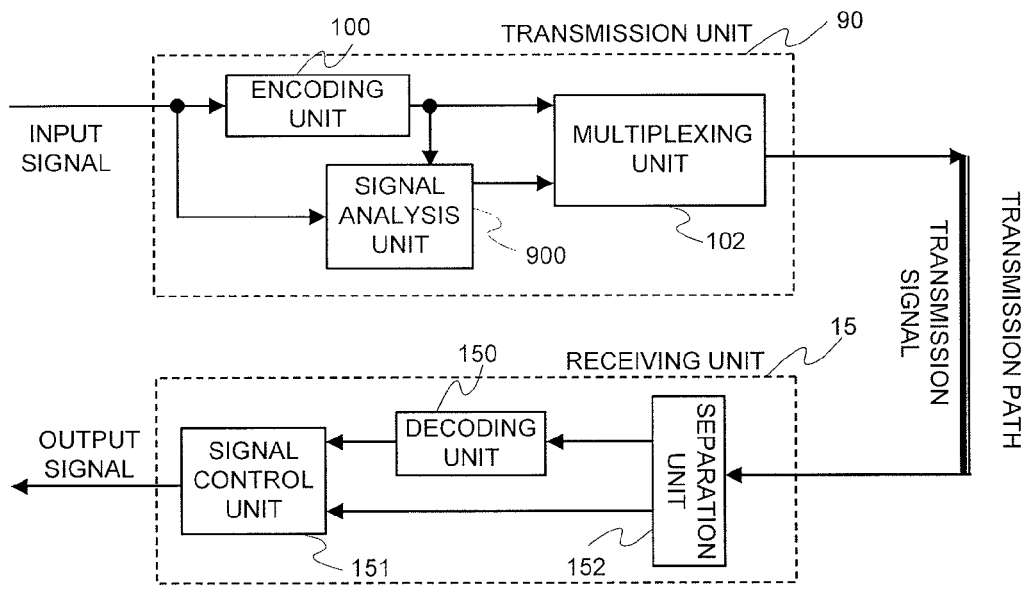
FIG. 24 is a block diagram illustrating a fifth embodiment of the present invention.

A fifth embodiment of the present invention is characterized in making an analysis taking into consideration an influence of quantizing distortion that has occurred in the encoding unit. The fifth embodiment of the present invention will be explained in details by making a reference to FIG. 24. Upon making a comparison with the first embodiment of the present invention shown in FIG. 1, the transmission unit 10 of the first embodiment is replaced with a transmission unit 90. In addition, while the transmission unit 10 is configured of the signal analysis unit 101, the transmission unit 90 is configured of a signal analysis unit 900. Further, the input signal and the encoded signal coming from an encoding unit 100 are inputted into the signal analysis unit 900.

Further, in the second embodiment to the fourth embodiment, the signal analysis unit 101 being included in the transmission unit 10 may be replaced with the signal analysis unit 900 of this embodiment. In this case, it is enough for the input signal and the encoded signal coming from an encoding unit 100 to be inputted into the signal analysis unit 900.

With the fifth embodiment, the signal analysis unit 900 makes an analysis taking into consideration an influence of quantizing distortion that has occurred in the encoding unit, thereby enabling the quantizing distortion, which occurs at the moment that the receiving unit 15 performs the decoding, to be reduced.

Figure 25:
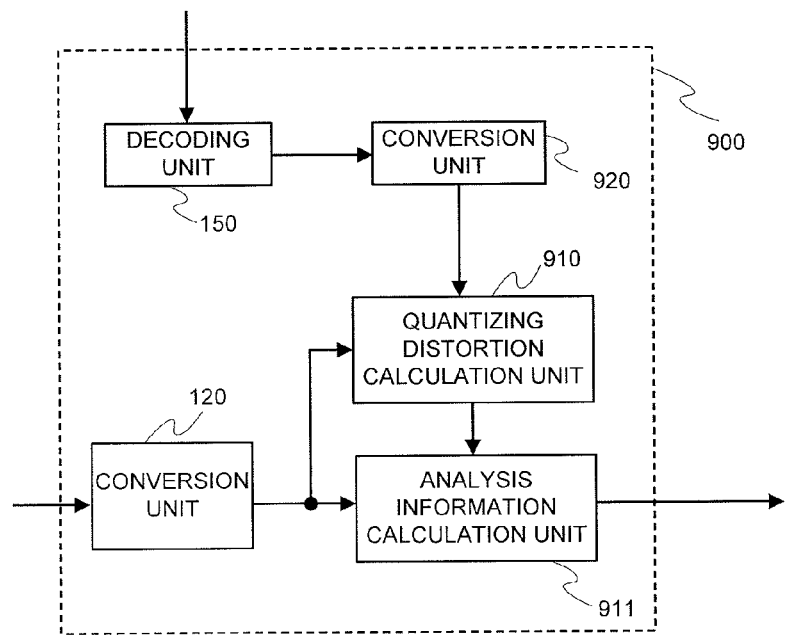
FIG. 25 shows a configuration example of a signal analysis unit 900.

A first configuration example of the signal analysis unit 900 will be explained in details by making a reference to FIG. 25. The signal analysis unit 900 receives the input signal and the encoded signal coming from an encoding unit 100, and outputs the analysis information. The signal analysis unit 900 generates the analysis information from the input signal and the encoded signal coming from an encoding unit 100. The signal analysis unit 900 can generate the analysis information by taking the quantizing distortion quantity into consideration because the encoded signal is a signal to which the quantizing distortion has been added.

The signal analysis unit 900 receives the input signal and the encoded signal coming from the encoding unit 100, and outputs the analysis information. The signal analysis unit 900 is configured of a conversion unit 120, a decoding unit 150, a quantizing distortion calculation unit 910, an analysis information calculation unit 911, and a conversion unit 920.

The input signal is inputted into the conversion unit 120. Further, the encoded signal coming from the encoding unit 100 is inputted into the decoding unit 150.

The decoding unit 150 decodes the encoded signal inputted from the encoding unit 100. The decoding unit 150 outputs the decoded signal to the conversion unit 920. The conversion unit 920 decomposes the decoded signal into the frequency components. The conversion unit 920 outputs the decoded signal decomposed into the frequency components to the quantizing distortion calculation unit 910.

The conversion unit 120 decomposes the input signal into the frequency components. The conversion unit 120 outputs the input signal decomposed into the frequency components to the quantizing distortion calculation unit 910 and the analysis information calculation unit 911. The quantizing distortion calculation unit 910 compares the decoded signal decomposed into the frequency components with the input signal decomposed into the frequency components, and calculates the quantizing distortion quantity for each frequency component. For this, normally, each of the conversion unit 920 and the conversion unit 120 executes the identical conversion. Unless each of them executes the identical conversion, a process of taking a matching of the frequency band, the converted component, etc. becomes necessary so that at least the quantizing distortion calculation unit 910 can calculate the quantizing distortion that occurs in the identical signal. With the calculation of the quantizing distortion, for example, a difference between magnitude of each frequency component of the decoded signal decomposed into the frequency components and magnitude of each frequency component of the input signal decomposed into the frequency components could be the quantizing distortion in the above frequency. The quantizing distortion calculation unit 910 outputs the quantizing distortion quantity of each frequency to the analysis information calculation unit 911.

The analysis information calculation unit 911 receives the input signal decomposed into the frequency components from the conversion unit 120, and receives the quantizing distortion quantity of each frequency from the quantizing distortion calculation unit 910. With regard to the input signal decomposed into the frequency components, the analysis information calculation unit 911 decomposes the input signal corresponding to each frequency component for each component element. The signal could be a signal that is configured of a plurality of the general sound sources. And, the analysis information calculation unit 911 generates the analysis information indicative of a relation between a plurality of the component elements. The analysis information calculation unit 911 outputs the analysis information. Further, with regard to the input signal decomposed into the frequency components, the analysis information calculation unit 911 may decompose the input signal for each component element group that is configured of a plurality of the component elements.

The analysis information calculation unit 911, taking the quantizing distortion quantity into consideration, calculates the analysis information so that the quantizing distortion is reduced at the moment that the receiving unit performs the decoding. For example, the analysis information calculation unit 911 may calculate the analysis information from magnitude of each frequency component of the input signal decomposed into the frequency components and magnitude of the quantizing distortion in the above frequency so that the quantizing distortion is auditorily masked. Herein, the analysis information calculation unit 911 may utilize the fact that the small component becomes hard to hear in a frequency neighboring the frequency of which the frequency component is large due to the auditory masking. The magnitude of the component, which becomes hard to hear in the neighboring frequency due to the magnitude of each frequency component, is defined as a masking characteristic. The analysis information calculation unit 911 may calculate the masking characteristic in terms of all frequencies in some cases, and may calculate it only in terms of a specific frequency band in some cases. The analysis information calculation unit 911 corrects the analysis information by taking an influence of the quantizing distortion into consideration in each frequency. The quantizing distortion is hard to hear when the magnitude of the quantizing distortion is smaller than the masking characteristic. In this case, the analysis information calculation unit 911 does not correct the analysis information because an influence of the quantizing distortion is small. The quantizing distortion is not masked when the magnitude of the quantizing distortion is larger than the masking characteristic. In this case, the analysis information calculation unit 911 corrects the analysis information so that the quantizing distortion is reduced.

As mentioned above, the analysis information calculation unit 911 corrects the analysis information, thereby allowing quantizing distortion to be auditorily masked, and the distortion and the noise to be reduced at the moment that the receiving unit performs the decoding.

So far, the correction of the analysis information such that the quantizing distortion was reduced by taking the auditory masking into consideration was explained. However, a configuration for correcting the analysis information so that the quantizing distortion is reduced in all frequencies without the auditory masking taken into consideration may be employed.

Figure 26:
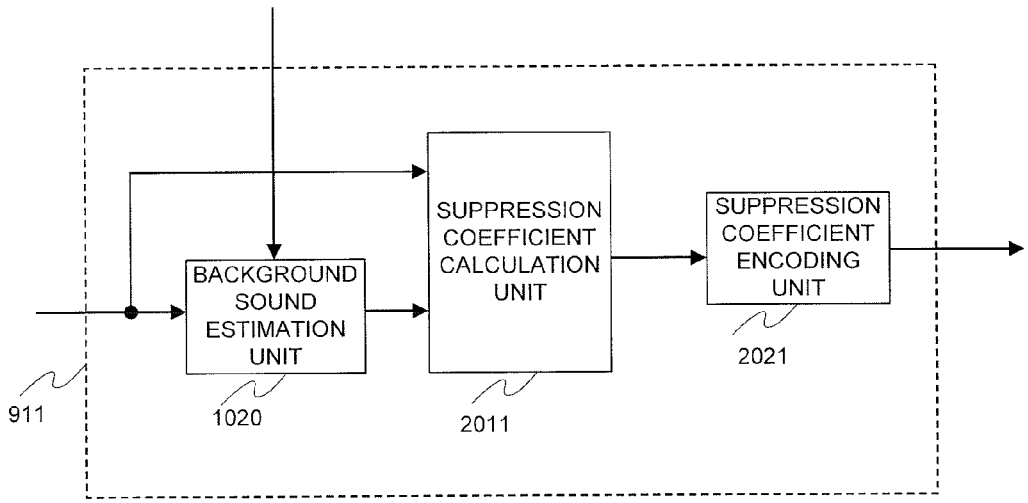
FIG. 26 shows a configuration example of an analysis information calculation unit 911.

Continuously, a configuration example of the analysis information calculation unit 911 will be explained in details by making a reference to FIG. 26 with the input signal, which is configured of the objective sound and the background sound, being a plurality of the sound sources, targeted as an example of the case that the analysis information is suppression coefficient information. The analysis information calculation unit 911 receives the input signal decomposed into the frequency components and the quantizing distortion quantity of each frequency, and outputs the analysis information. The analysis information calculation unit 911 is configured of a background sound information generation unit 202, a suppression coefficient calculation unit 2011, and a suppression coefficient encoding unit 2021.

The background sound estimation unit 1020 receives the input signal decomposed into the frequency components and the quantizing distortion quantity of each frequency. The background sound estimation unit 1020 estimates the background sound by taking the quantizing distortion quantity into consideration. For example, the background sound estimation unit 1020 may perform a process similar to the process, which the background sound estimation unit 200 being included in the analysis information calculation unit 121 performs, with the background sound obtained by adding the quantizing distortion to the estimated background sound defined as an estimated background sound. The background sound estimation unit 1020 outputs the background sound estimation result in which the quantizing distortion has been taken into consideration to the suppression coefficient calculation unit 2011. The suppression coefficient calculation unit 2011 and the suppression coefficient encoding unit 2021 were already explained in the first embodiment. With this configuration, the analysis information in which the quantizing distortion has been taken into consideration can be yielded. In addition, when the suppression coefficient is employed as analysis information, the suppression coefficient, which is relatively small, should be employed so as to suppress the quantizing distortion as well simultaneously with the background sound.

As explained above, the signal analysis unit 900 generates the analysis information so as to reduce an influence of the encoding distortion that occurred in the encoding unit 100. The receiving unit 15, responding to this, controls the decoded signal based upon the analysis information in which the quantizing distortion has been taken into consideration. This configuration makes it possible to take a high-quality control in which the quantizing distortion has been taken into consideration at the moment of controlling the decoded signal. In addition, this configuration yields an effect that the quantizing distortion, which occurs when the receiving unit 15 performs the decoding, can be reduced.

Above, in the fifth embodiment of the present invention, the transmission side generates the suppression coefficient information in which the quantizing distortion has been taken into consideration. Thus, the receiving side can generate the coefficient correction lower-limit value based upon the suppression coefficient information in which the quantizing distortion has been taken into consideration. And, the receiving side controls the decoded signal by employing the above-mentioned coefficient correction lower-limit value. This configuration makes it possible to take a high-quality control in which the quantizing distortion has been taken into consideration at the moment of controlling the decoded signal. In addition, this configuration yields an effect that the quantizing distortion and the encoding distortion, which occur when the receiving unit 15 performs the decoding, can be reduced.

Next, a sixth embodiment of the present invention will be explained. The sixth embodiment of the present invention uses a plurality of conversion units being included in the signal analysis unit 900 and the conversion unit being included in the encoding unit 100 as a common conversion unit, thereby allowing the arithmetic quantity in the transmission side unit, and the arithmetic quantity relating to the control for each component element, which is taken by the receiving side unit based upon the analysis information, to be reduced.

The sixth embodiment of the present invention will be explained by making a reference to FIG. 27. The sixth embodiment of the present invention shown in FIG. 27 differs from the first embodiment of the present invention shown in FIG. 1 in a point that the transmission unit 10 is replaced with a transmission unit 13, and a point that the receiving unit 15 is replaced with a receiving unit 18. With this configuration, the sixth embodiment of the present invention can share the conversion unit existing in the transmission unit, and can share the conversion unit existing in the receiving unit. As a result, the arithmetic quantity of the transmission unit 13 and the receiving unit 18 can be reduced.

Figure 27:
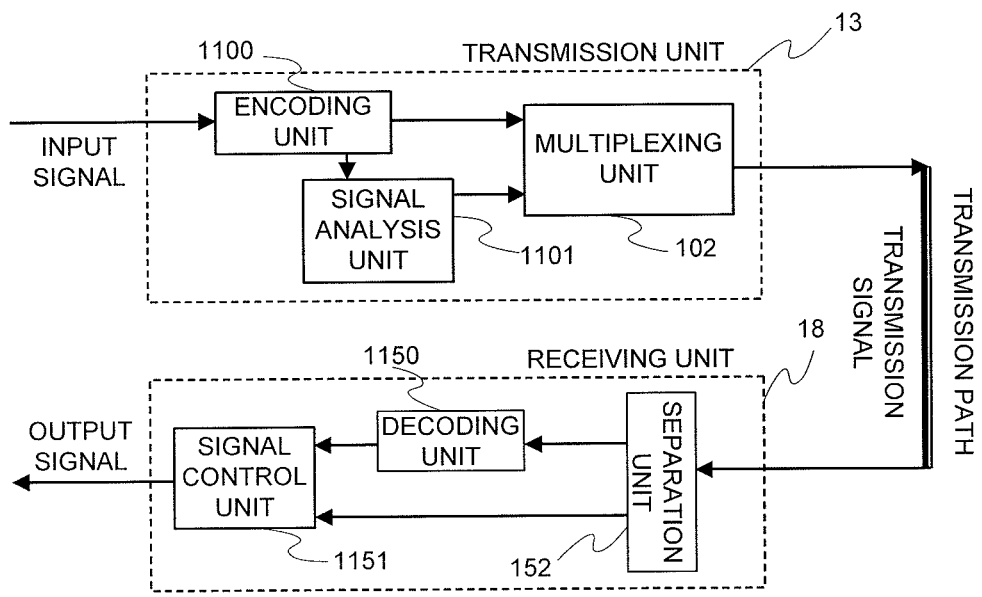
FIG. 27 is a block diagram illustrating an sixth embodiment of the present invention.

The transmission unit 13 shown in FIG. 27 differs from the transmission unit 10 shown in FIG. 1 in a point that the encoding unit 100 is replaced with an encoding unit 1100, and a point that the signal analysis unit 101 is replaced with a signal analysis unit 1101. In this embodiment, the encoding unit 1100 outputs the input signal decomposed into the frequency components to the signal analysis unit 1101.

Figure 28:
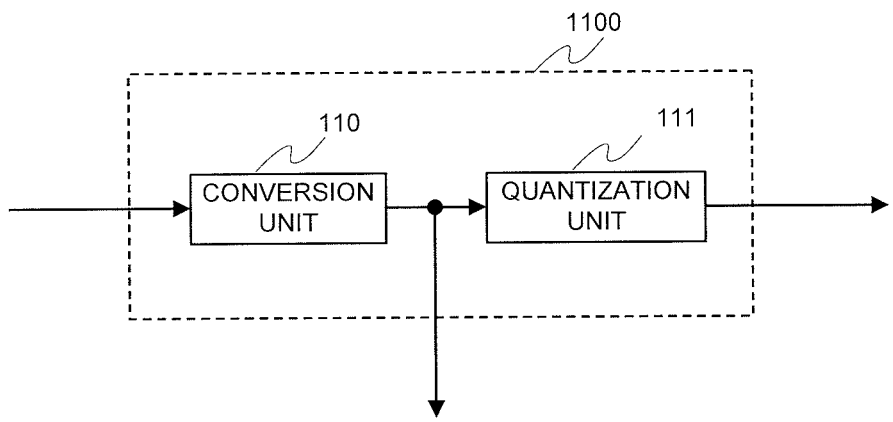
FIG. 28 shows a configuration example of an encoding unit 1100.

A configuration example of the encoding unit 1100 will be explained in details by making a reference to FIG. 28. The encoding unit 1100 shown in FIG. 28 differs from the encoding unit 100 shown in FIG. 2 in a point that the first converted signal, being an output of the conversion unit 110, is outputted to the signal analysis unit 1101. An operation of the conversion unit 110 and the quantization unit 111 overlaps the operation explained in FIG. 2, so its explanation is omitted. Herein, the arithmetic quantity of the encoding unit 1100 is almost identical to that of the encoding unit 100 because the encoding unit 1100 differs from the encoding unit 100 shown in FIG. 2 only in the signal being outputted.

Figure 29:
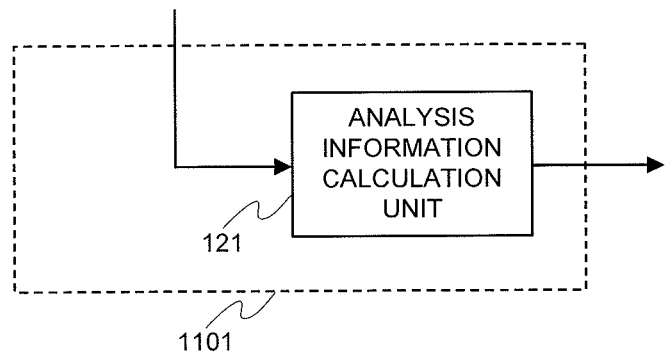
FIG. 29 shows a configuration example of a signal analysis unit 1101.

A configuration example of the signal analysis unit 1101 will be explained in details by making a reference to FIG. 29. The signal analysis unit 1101 shown in FIG. 29 differs from the signal analysis unit 101 shown in FIG. 4 in a point that the conversion unit 120 included in the signal analysis unit 101 is deleted.

The signal analysis unit 1101 receives the first converted signal from the encoding unit 1100. The received first converted signal is inputted into the analysis information calculation unit 121. Herein, upon comparing the conversion unit 110 within the encoding unit 1100 shown in FIG. 28 with the conversion unit 120 within the signal analysis unit 101 shown in FIG. 4, the first converted signal, being an output of the former, and the second converted signal, being an output of the latter, become identical to each other when the input signal being supplied to the conversion unit is identical and an operation of the conversion unit is identical. For this, it is possible to delete the conversion unit 120 in the signal analysis unit 1101, and to use the first converted signal being outputted by the signal analysis unit 1101 as the second converted signal when an operation of the conversion unit 110 is identical to that of the conversion unit 120. With this configuration, the arithmetic quantity of the signal analysis unit 1101 is curtailed by a portion equivalent to the arithmetic quantity of the conversion unit 120 as compared with the arithmetic quantity of the signal analysis unit 101. An operation of the analysis information calculation unit 121 overlaps the operation explained in FIG. 4, so its explanation is omitted.

The receiving unit 18 shown in FIG. 27 differs from the receiving unit 15 shown in FIG. 1 in a point that the decoding unit 150 is replaced with a decoding unit 1150, and a point that the signal control unit 151 is replaced with a signal control unit 1151.

Figure 30:
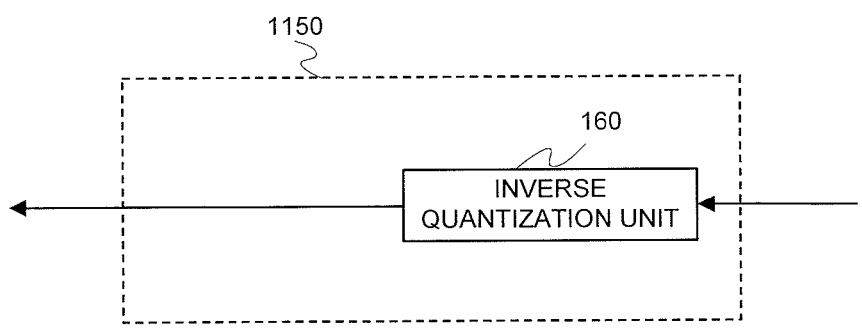
FIG. 30 shows a configuration example of a decoding unit 1150.

A configuration example of the decoding unit 1150 will be explained by making a reference to FIG. 30. The decoding unit 1150 differs from decoding unit 150 shown in FIG. 3 in point that the inverse conversion unit 161 is deleted. An operation of the inverse quantization unit 160 overlap the operation explained in FIG. 3, so its explanation is omitted. In the decoding unit 150 shown in FIG. 3, the inverse conversion unit 161 inverse-converts the first converted signal being outputted by the inverse quantization unit 160 into a time region signal, and outputs it as a decoded signal to the conversion unit 171 shown in FIG. 5. In FIG. 5, the conversion unit 171 performs a process of receiving the decoded signal, and performs a process of converting it into the second converted signal. Herein, as mentioned above, the first converted signal can be used as the second converted signal when an operation of the conversion unit 110 is identical to that of the conversion unit 120. With this, the decoding unit 1150 outputs the first converted signal being outputted by the inverse quantization unit 160 to the signal processing unit 172 being included in the signal control unit 1151 in this embodiment. Thus, in this embodiment, the inverse conversion unit 161 can be deleted.

Figure 31:
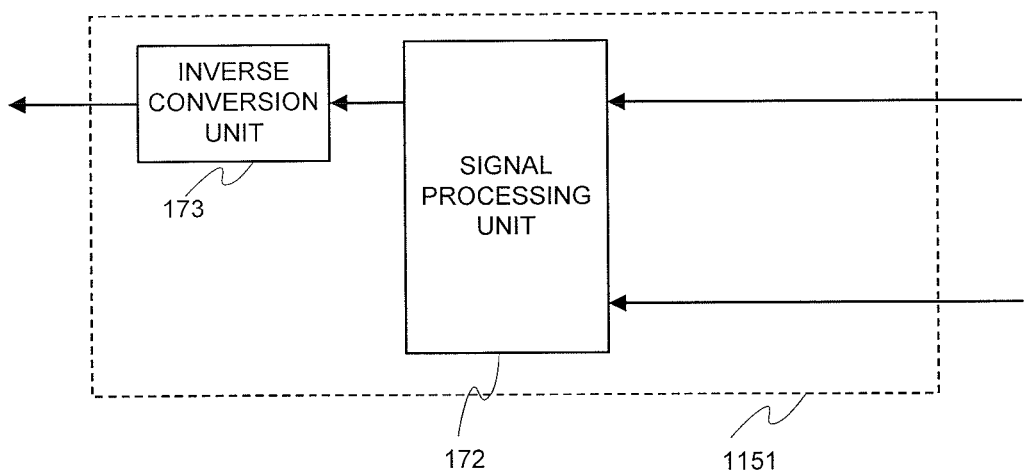
FIG. 31 shows a configuration example of a signal control unit 1151.

A configuration example of the signal control unit 1151 will be explained in details by making a reference to FIG. 31. The signal control unit 1151 shown in FIG. 31 differs from the signal control unit 151 shown in FIG. 5 in point that the conversion unit 171 is deleted. An operation of the signal processing unit 172 and the inverse conversion unit 173 overlaps the operation explained in FIG. 5, so its explanation is omitted.

Figure 5:
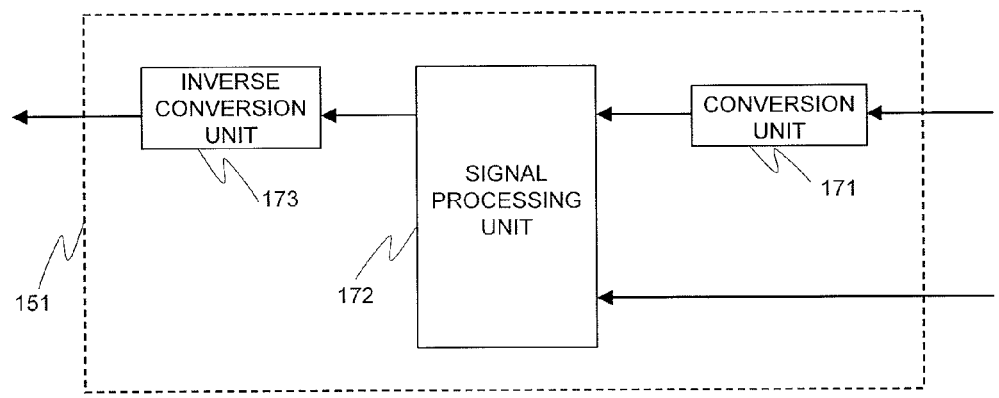
FIG. 5 shows a configuration example of a signal control unit 151.

In the signal control unit 151 of FIG. 5, the conversion unit 171 converts the decoded signal inputted as a time region signal into the second converted signal, and outputs it to the signal processing unit 172. As mentioned above, the first converted signal can be used as the second converted signal when an operation of the conversion unit 110 is identical to that of the conversion unit 120. With this, the signal processing unit 172 being included in the signal control unit 1151 can receive the first converted signal being outputted by the inverse quantization unit 160. Thus, in this embodiment, the conversion unit 171 can be deleted.

Herein, upon paying attention to the signal being inputted into the signal control unit 1151 from the decoding unit 1150, it can be seen that a difference between the first embodiment shown in FIG. 1 and the sixth embodiment shown in FIG. 27 is whether or not the signal being outputted by the inverse quantization unit 160 goes through the inverse conversion unit 161 and the conversion unit 171. When the first converted signal can be used as the second converted signal, the frequency component of the signal being outputted by the inverse quantization unit 160 is identical to the frequency component of the signal being inputted into the signal processing unit 172 in both of the first embodiment and the sixth embodiment. Thus, the signal processing unit 172 within the signal control unit 1151 outputs a result identical to the result that the signal processing unit 172 shown in FIG. 5 outputs. Further, the arithmetic quantity of the decoding unit 1150 is curtailed by a portion equivalent to the arithmetic quantity of the inverse conversion unit 161 shown in FIG. 3 as compared with the arithmetic quantity of the decoding unit 150. In addition, the arithmetic quantity of the signal control unit 1151 is curtailed by a portion equivalent to the arithmetic quantity of the conversion unit 171 shown in FIG. 5 as compared with the arithmetic quantity of the signal control unit 151.

Above, the sixth embodiment of the present invention has an effect that the arithmetic quantity is curtailed by a portion equivalent to the respective arithmetic quantities of the conversion unit 120, the inverse conversion unit 161, and the conversion unit 171 as compared with the case of the first embodiment in addition to the effect of the first embodiment of the present invention. In addition, the configuration of the sixth embodiment capable of curtailing the arithmetic quantity is applicable to the second embodiment to the fifth embodiment of the present invention. With this, each embodiment has an effect of curtailing the arithmetic quantity that is similar to the effect of the sixth embodiment of the present invention.

Figure 32:
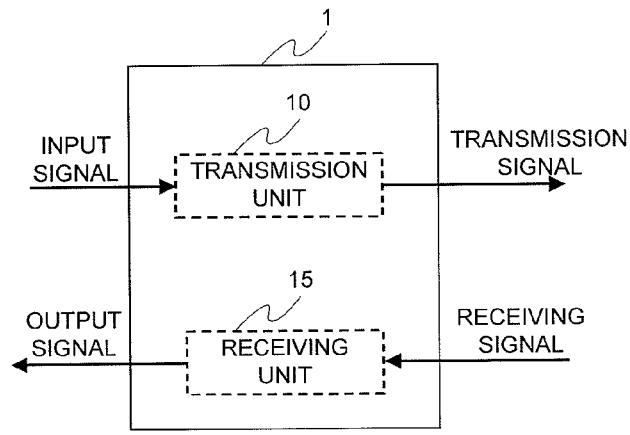
FIG. 32 is a block diagram illustrating a seventh embodiment of the present invention.

A seventh embodiment of the present invention will be explained by making a reference to FIG. 32. Only One-way communication was taken into consideration in the embodiments ranging from the first embodiment up to the sixth embodiment. That is, the communication between the transmission unit integrally built in a terminal and the receiving unit integrally built in another terminal was explained. In the seventh embodiment, which takes bilateral communication into consideration, both of the transmission unit and the receiving unit for which the present invention has been applied are integrally built in one transmission/reception terminal. As a terminal having both of the transmission unit and the receiving unit integrally built therein, for which the present invention has been applied, a combination of any of the transmission units of the first embodiment to the sixth embodiment, and any of the receiving units of the first embodiment to the sixth embodiment may be employed. In the seventh embodiment of the present invention, incorporating both of the transmission unit and the receiving unit into the terminal yields an effect of the present invention at the moment of utilizing it for the bilateral communication apparatuses such as a television conference terminal and a mobile telephone.

The signal analysis control system of the present invention is applicable in the case that the one-way sound communication is made, for example, in the case of a broadcast. It is enough for the transmission terminal of a broadcast station to have, for example, at least the transmission unit 10 shown in FIG. 1. The so-called broadcast station includes not only a licensed broadcast station but also a point in which sound is transmitted and no reception is almost performed, for example, a main site of a multi-point television conference. Any of the transmission units of the first embodiment to the sixth embodiment of the present invention may be employed for this transmission terminal.

Further, the signal analysis control system of the present invention is applicable to a point as well in which only the reception is performed. It is enough for the reception terminal in a point in which only the reception is performed to have, for example, at least the receiving unit 15 shown in FIG. 1. Any of the receiving units of the first embodiment to the sixth embodiment of the present invention may be employed for this reception terminal.

Figure 33:
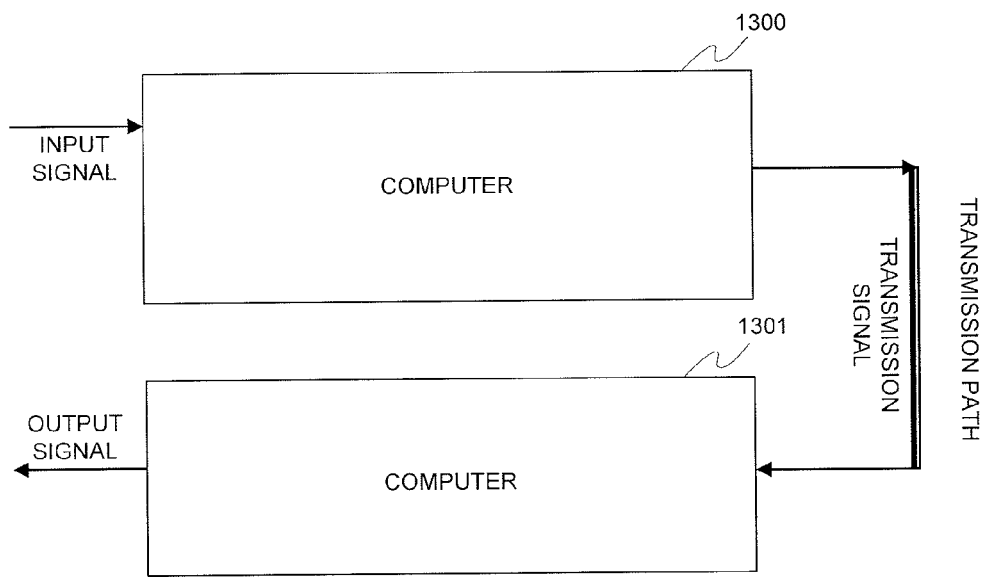
FIG. 33 is a block diagram illustrating an eighth embodiment of the present invention.

In addition, the signal process apparatus based upon an eighth embodiment of the present invention will be explained in details by making a reference to FIG. 33. The eighth embodiment of the present invention is configured of computers 1300 and 1301 each of which operates under a program control. The computer could be any of a central processing apparatus, a processor, and a data processing apparatus.

The computer 1300, which performs a process relating to any of the first embodiment to the seventh embodiment, operates based upon a program for receiving the input signal and outputting the transmission signal. On the other hand, the computer 1301, which performs a process relating to any of the first embodiment to the seventh embodiment, operates based upon a program for receiving the transmission signal and outputting the output signal. Additionally, in the case of having both of the transmission unit and receiving unit explained in the seventh embodiment, the transmission process and the reception process may be executed by employing the identical computer.

While in the first embodiment to the eighth embodiment explained above, the operations of the transmission unit, the transmission path, and the receiving unit were exemplified, they may be replaced with the recoding unit, the storage medium, and the reproduction unit, respectively. For example, the transmission unit 10 shown in FIG. 1 may output the transmission signal as a bit stream to the storage medium, and record the bit stream into the storage medium. Further, the receiving unit 15 may take out the bit stream recorded into the storage medium, and generate the output signal by decoding the bit stream and performing a process therefor.

The 1st mode of the present invention is characterized in that a signal control method, comprising: receiving a multiplexed signal including a signal including a plurality of component elements and analysis information being calculated based upon said component element; generating said signal and said analysis information from said multiplexed signal; generating a correction value for correcting said analysis information based upon said analysis information; correcting said analysis information based upon said correction value; and controlling the component elements of said signal based upon said corrected analysis information.

Furthermore, the 2nd mode of the present invention is characterized in that a signal control method, comprising: receiving a multiplexed signal including a signal including a plurality of component elements and analysis information being calculated based upon said component element, and signal control information; generating said signal and said analysis information from said multiplexed signal; generating a correction value for correcting said analysis information based upon said analysis information; correcting said analysis information based upon said correction value; and controlling the component elements of said signal based upon said corrected analysis information and said signal control information.

Furthermore, the 3rd mode of the present invention is characterized in that a signal control method, comprising: receiving a multiplexed signal including a signal including a plurality of component elements and analysis information being calculated based upon said component element, and component element rendering information for outputting said component elements to a plurality of output channels; generating said signal and said analysis information from said multiplexed signal; generating a correction value for correcting said analysis information based upon said analysis information; correcting said analysis information based upon said correction value; and controlling the component elements of said signal based upon said corrected analysis information and said component element rendering information.

Furthermore, the 4th mode of the present invention is characterized in that a signal control method, comprising: receiving a multiplexed signal including a signal including a plurality of component elements and analysis information being calculated based upon said component element, signal control information, and component element rendering information for outputting said component elements to a plurality of output channels; generating said signal and said analysis information from said multiplexed signal; generating a correction value for correcting said analysis information based upon said analysis information; correcting said analysis information based upon said correction value; and controlling the component elements of said signal based upon said corrected analysis information, said signal control information, and said component element rendering information.

Furthermore, the 5th mode of the present invention, in the above-mentioned mode, is characterized in that said component element rendering information includes localization information of said component element.

Furthermore, the 6th mode of the present invention, in the above-mentioned mode, is characterized in that said analysis information includes a suppression coefficient.

Furthermore, the 7th mode of the present invention, in the above-mentioned mode, is characterized in that said correction value includes a coefficient correction lower-limit value.

Furthermore, the 8th mode of the present invention is characterized in that a signal analysis control method, comprising: generating analysis information being calculated based upon a plurality of component elements that are included in a signal; multiplexing said signal and said analysis information and generating a multiplexed signal; receiving said multiplexed signal; generating said signal and said analysis information from said multiplexed signal; generating a correction value for correcting said analysis information based upon said analysis information; correcting said analysis information based upon said correction value; and controlling the component elements of said signal based upon said corrected analysis information.

Furthermore, the 9th mode of the present invention is characterized in that a signal control apparatus, comprising: a multiplexed signal separation unit for, from a multiplexed signal including a signal including a plurality of component elements and analysis information being calculated based upon said component element, generating said signal and said analysis information; an analysis information correction value generation unit for generating a correction value for correcting said analysis information based upon said analysis information; an analysis information correction unit for correcting said analysis information based upon said correction value; and a signal processing unit for controlling the component elements of said signal based upon said corrected analysis information.

Furthermore, the 10th mode of the present invention is characterized in that a signal control apparatus, comprising: a multiplexed signal separation unit for, from a multiplexed signal including a signal including a plurality of component elements and analysis information being calculated based upon said component element, generating said signal and said analysis information; an analysis information correction value generation unit for generating a correction value for correcting said analysis information based upon said analysis information; an analysis information correction unit for correcting said analysis information based upon said correction value; and a signal processing unit for receiving signal control information and controlling the component elements of said signal based upon said corrected analysis information and said signal control information.

Furthermore, the 11th mode of the present invention is characterized in that a signal control apparatus, comprising: a multiplexed signal separation unit for, from a multiplexed signal including a signal including a plurality of component elements and analysis information for controlling said component element, generating said signal and said analysis information; an analysis information correction value generation unit for generating a correction value for correcting said analysis information based upon said analysis information; an analysis information correction unit for correcting said analysis information based upon said correction value; and a signal processing unit for receiving component element rendering information for outputting said component elements to a plurality of output channels, and controlling the component elements of said signal based upon said corrected analysis information and said component element rendering information.

Furthermore, the 12th mode of the present invention is characterized in that a signal control apparatus, comprising: a multiplexed signal separation unit for, from a multiplexed signal including a signal including a plurality of component elements and analysis information for controlling said component element, generating said signal and said analysis information; an analysis information correction value generation unit for generating a correction value for correcting said analysis information based upon said analysis information; an analysis information correction unit for correcting said analysis information based upon said correction value; and a signal processing unit for receiving signal control information and component element rendering information for outputting said component elements to a plurality of output channels, and controlling the component elements of said signal based upon said corrected analysis information, said signal control information, and said component element rendering information.

Furthermore, the 13th mode of the present invention, in the above-mentioned mode, is characterized in that said component element rendering information includes localization information of said component element.

Furthermore, the 14th mode of the present invention, in the above-mentioned mode, is characterized in that said analysis information includes a suppression coefficient.

Furthermore, the 15th mode of the present invention, in the above-mentioned mode, is characterized in that said correction value includes a coefficient correction lower-limit value.

Furthermore, the 16th mode of the present invention is characterized in that a signal analysis control system including a signal analysis apparatus and a signal control apparatus: wherein said signal analysis apparatus comprises: a signal analysis unit for generating analysis information being calculated based upon a plurality of component elements that are included in a signal; and a multiplexing unit for multiplexing said signal and said analysis information and generating a multiplexed signal; and wherein said signal control apparatus comprises: a multiplexed signal separation unit for generating said signal and said analysis information from said multiplexed signal; an analysis information correction value generation unit for generating a correction value for correcting said analysis information based upon said analysis information; an analysis information correction unit for correcting said analysis information based upon said correction value; and a signal processing unit for controlling the component elements of said signal based upon said corrected analysis information.

Furthermore, the 17th mode of the present invention is characterized in that a signal control program for causing a computer to execute: a multiplexed signal separation process of from a multiplexed signal including a signal including a plurality of component elements and analysis information being calculated based upon said component element, generating said signal and said analysis information; an analysis information correction value generation process of generating a correction value for correcting said analysis information based upon said analysis information; an analysis information correction process of correcting said analysis information based upon said correction value; and a signal control process of controlling the component elements of said signal based upon said corrected analysis information.

Furthermore, the 18th mode of the present invention is characterized in that a signal control program for causing a computer to execute: a multiplexed signal separation process of, from a multiplexed signal including a signal including a plurality of component elements and analysis information being calculated based upon said component element, generating said signal and said analysis information; an analysis information correction value generation process of generating a correction value for correcting said analysis information based upon said analysis information; an analysis information correction process of correcting said analysis information based upon said correction value; and a signal control process of receiving signal control information and controlling the component elements of said signal based upon said corrected analysis information and said signal control information.

Furthermore, the 19th mode of the present invention is characterized in that a signal control program for causing a computer to execute: a multiplexed signal separation process of, from a multiplexed signal including a signal including a plurality of component elements and analysis information being calculated based upon said component element, generating said signal and said analysis information; an analysis information correction value generation process of generating a correction value for correcting said analysis information based upon said analysis information; an analysis information correction process of correcting said analysis information based upon said correction value; and a signal control process of receiving component element rendering information for outputting said component elements to a plurality of output channels, and controlling the component elements of said signal based upon said corrected analysis information and said component element rendering information.

Furthermore, the 20th mode of the present invention is characterized in that a signal control program for causing a computer to execute: a multiplexed signal separation process of, from a multiplexed signal including a signal including a plurality of component elements and analysis information being calculated based upon said component element, generating said signal and said analysis information; an analysis information correction value generation process of generating a correction value for correcting said analysis information based upon said analysis information; an analysis information correction process of correcting said analysis information based upon said correction value; and a signal control process of receiving signal control information and component element rendering information for outputting said component elements to a plurality of output channels, and controlling the component elements of said signal based upon said corrected analysis information, said signal control information, and said component element rendering information.

Furthermore, the 21st mode of the present invention, in the above-mentioned mode, is characterized in that said component element rendering information includes localization information of said component element.

Furthermore, the 22nd mode of the present invention, in the above-mentioned mode, is characterized in that said analysis information includes a suppression coefficient.

Furthermore, the 23rd mode of the present invention, in the above-mentioned mode, is characterized in that said correction value includes a coefficient correction lower-limit value.

Furthermore, the 24th mode of the present invention is characterized in that a signal analysis control program for causing a computer to execute: a signal analysis process of generating analysis information being calculated based upon a plurality of component elements that are included in a signal; a multiplexing process of multiplexing said signal and said analysis information and generating a multiplexed signal; a multiplexed signal separation process of generating said signal and said analysis information from said multiplexed signal; an analysis information correction value generation process of generating a correction value for correcting said analysis information based upon said analysis information; an analysis information correction process of correcting said analysis information based upon said correction value; and a signal analysis process of controlling the component elements of said signal based upon said corrected analysis information.

Above, although the present invention has been particularly described with reference to the preferred embodiments and modes thereof, it should be readily apparent to those of ordinary skill in the art that the present invention is not always limited to the above-mentioned embodiment and modes, and changes and modifications in the form and details may be made without departing from the sprit and scope of the invention.

APPLICABILITY IN INDUSTRY

The present invention may be applied to an apparatus that performs signal analysis or signal control. The present invention may also be applied to a program that causes a computer to execute signal analysis or signal control.

The invention claimed is:
1. A signal control method, comprising:
receiving a multiplexed signal including a signal including objective sound and background sound analysis information including at least a suppression coefficient for suppressing said objective sound, said suppression coefficient being calculated based upon said objective sound and said background sound;
generating said signal and said analysis information from said multiplexed signal;
generating a suppression coefficient correction lower-limit value, being a lower-limit value of said suppression coefficient, based upon said analysis information;
correcting the suppression coefficient of said analysis information based upon said suppression coefficient correction lower-limit value; and
controlling the background sound of said signal based upon said corrected suppression coefficient of the analysis information.

2. The signal control method according to claim 1, comprising:
receiving said multiplexed signal and signal control information; and
controlling the component elements of said signal based upon said corrected analysis information and said signal control information.

3. The signal control method according to claim 1, comprising:
receiving said multiplexed signal and component element rendering information for outputting said component elements to a plurality of output channels; and
controlling the component elements of said signal based upon said corrected analysis information and said component element rendering information.

4. The signal control method according to claim 3, wherein said component element rendering information includes localization information of said component element.

5. The signal control method according to claim 1, comprising:
receiving said multiplexed signal, signal control information, and component element rendering information for outputting said component elements to a plurality of output channels; and
controlling the component elements of said signal based upon said corrected analysis information, said signal control information, and said component element rendering information.

6. The signal control method according to claim 5, wherein said component element rendering information includes localization information of said component element.

7. The signal control method according to claim 1, wherein said analysis information includes a suppression coefficient.

8. The signal control method according to claim 1, wherein said correction value includes a coefficient correction lower-limit value.

9. A signal control apparatus, comprising:
a multiplexed signal separation unit that, from a multiplexed signal including a signal including objective sound and background sound and analysis information including at least a suppression coefficient for suppressing said objective sound, said suppression coefficient being calculated based upon said objective sound and said background sound, separates said signal and said analysis information;
an analysis information correction value generation unit that generates a suppression coefficient correction lower-limit value, being a lower-limit value of said suppression coefficient, based upon said analysis information;
an analysis information correction unit that corrects the suppression coefficient of said analysis information based upon said suppression coefficient correction lower-limit value; and
a signal processing unit that controls the background sound of said signal based upon said corrected suppression coefficient of the analysis information.

10. The signal control apparatus according to claim 9, wherein said signal processing unit that receives signal control information and controls the component elements of said signal based upon said corrected analysis information and said signal control information.

11. The signal control apparatus according to claim 9, wherein said signal processing unit that receives component element rendering information for outputting said component elements to a plurality of output channels, and controls the component elements of said signal based upon said corrected analysis information and said component element rendering information.

12. The signal control apparatus according to claim 11, wherein said component element rendering information includes localization information of said component element.

13. The signal control apparatus according to claim 9, wherein said signal processing unit that receives signal control information and component element rendering information for outputting said component elements to a plurality of output channels, and controls the component elements of said signal based upon said corrected analysis information, said signal control information and said component element rendering information.

14. The signal control apparatus according to claim 13, wherein said component element rendering information includes localization information of said component element.

15. The signal control apparatus according to claim 9, wherein said analysis information includes a suppression coefficient.

16. The signal control apparatus according to claim 9, wherein said correction value includes a coefficient correction lower-limit value.

17. A non-transitory computer readable storage medium storing a signal control program for causing a computer to execute:
a multiplexed signal separation process of, from a multiplexed signal including a signal including objective sound and background sound and analysis information including at least a suppression coefficient for suppressing said objective sound, said suppression coefficient being calculated based upon said objective sound and said background sound, separating said signal and said analysis information;
an analysis information correction value generation process of generating a suppression coefficient correction lower-limit value, being a lower-limit value of said suppression coefficient, based upon said analysis information;
an analysis information correction process of correcting the suppression coefficient of said analysis information based upon said suppression coefficient correction lower-limit value; and
a signal control process of controlling the background sound of said signal based upon said corrected suppression coefficient of the analysis information.

* * * * *